(12) United States Patent
Schulz et al.

(10) Patent No.: US 8,253,360 B2
(45) Date of Patent: Aug. 28, 2012

(54) VECTOR CONTROLLED MOTOR DRIVE SYSTEM IMPLEMENTING PULSE WIDTH MODULATED (PWM) WAVEFORMS

(75) Inventors: Steven E. Schulz, Torrance, CA (US);
Yo Chan Son, Torrance, CA (US);
Nitinkumar R. Patel, Cypress, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 498 days.

(21) Appl. No.: 12/503,591

(22) Filed: Jul. 15, 2009

(65) Prior Publication Data

US 2011/0012544 A1    Jan. 20, 2011

(51) Int. Cl.
*H02P 21/00* (2006.01)
(52) U.S. Cl. .................... 318/400.02; 318/811
(58) Field of Classification Search .................. 318/727, 318/599, 811, 400.02, 400.33, 400.35
See application file for complete search history.

(56) References Cited

U.S. PATENT DOCUMENTS

| | | | |
|---|---|---|---|
| 5,550,450 A * | 8/1996 | Palko et al. | 318/800 |
| 5,585,709 A | 12/1996 | Jansen et al. | |
| 6,198,256 B1 * | 3/2001 | Miyazaki et al. | 322/16 |
| 7,129,677 B2 * | 10/2006 | Fu et al. | 363/89 |
| 2005/0207192 A1 * | 9/2005 | Fu et al. | 363/89 |
| 2007/0132415 A1 | 6/2007 | Patel et al. | |

OTHER PUBLICATIONS

Holtz, J. "Sensorless position control of induction motors—an emerging technology," IEEE Trans. Ind. Electron., Dec. 1998, pp. 840-852, vol. 45, No. 6.
Holtz, J. et al. "Elimination of saturation effects in sensorless position controlled induction motors," Conference Record IEEE-IAS Annual Meeting, 2002, pp. 1695-1702, vol. 3.

* cited by examiner

*Primary Examiner* — Rina Duda
(74) *Attorney, Agent, or Firm* — Ingrassia Fisher & Lorenz P.C.

(57) ABSTRACT

A vector controlled motor drive system is provided that includes a test vector and duty cycle generator module designed to receive a set of three-phase voltage command signals and designed to generate a set of pulse width modulated (PWM) waveforms. The set of PWM waveforms comprise: a first modified switching vector signal for a first motor phase that comprises at least two test pulses over three consecutive PWM cycles. The first modified switching vector signal has a first amplitude value that changes between a high amplitude value and a low amplitude value during the three consecutive PWM cycles. A number of transitions by the first modified switching vector signal between the low amplitude value and the high amplitude value over the three consecutive PWM cycles is greater than six and less than twelve.

18 Claims, 7 Drawing Sheets

| VECTOR | SWITCH 182 | SWITCH 186 | SWITCH 190 | SWITCH 184 | SWITCH 188 | SWITCH 192 | $V_{AB}$ | $V_{BC}$ | $V_{CA}$ | |
|---|---|---|---|---|---|---|---|---|---|---|
| $V_0 =$ (000) | OFF | OFF | OFF | ON | ON | ON | 0 | 0 | 0 | ZERO VECTOR |
| $V_1 =$ (100) | ON | OFF | OFF | OFF | ON | ON | $+V_{IN}$ | 0 | $-V_{IN}$ | ACTIVE VECTOR |
| $V_2 =$ (110) | ON | ON | OFF | OFF | OFF | ON | 0 | $+V_{IN}$ | $-V_{IN}$ | ACTIVE VECTOR |
| $V_3 =$ (010) | OFF | ON | OFF | ON | OFF | ON | $-V_{IN}$ | $+V_{IN}$ | 0 | ACTIVE VECTOR |
| $V_4 =$ (011) | OFF | ON | ON | ON | OFF | OFF | $-V_{IN}$ | 0 | $+V_{IN}$ | ACTIVE VECTOR |
| $V_5 =$ (001) | OFF | OFF | ON | ON | ON | OFF | 0 | $-V_{IN}$ | $+V_{IN}$ | ACTIVE VECTOR |
| $V_6 =$ (101) | ON | OFF | ON | OFF | ON | OFF | $+V_{IN}$ | $-V_{IN}$ | 0 | ACTIVE VECTOR |
| $V_7 =$ (111) | ON | ON | ON | OFF | OFF | OFF | 0 | 0 | 0 | ZERO VECTOR |

*FIG. 3B*
PRIOR ART

VECTOR CONTROLLED MOTOR DRIVE SYSTEM IMPLEMENTING PULSE WIDTH MODULATED (PWM) WAVEFORMS

TECHNICAL FIELD

The present invention generally relates to hybrid and electric vehicle power systems, and more particularly relates to techniques for estimating angular position of a rotor without sensors.

BACKGROUND OF THE INVENTION

Hybrid and electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement two three-phase pulse width modulated (PWM) inverter modules and two three-phase AC machines (e.g., AC motors) each being driven by a corresponding one of the three-phase PWM inverter modules that it is coupled to.

Many modern high performance AC motor drives use the principle of field oriented control (FOC) or "vector" control to control operation of the AC electric motor. In particular, vector control is often used in variable frequency drives to control the torque applied to the shaft (and thus finally the speed) of a three-phase AC electric motor by controlling the current fed to the three-phase AC electric motor. In short, stator phase currents are measured and converted into a corresponding complex space vector. This current vector is then transformed to a coordinate system rotating with the rotor of the three-phase AC electric motor. This technique requires knowledge of the rotor's angular position (i.e., the mechanical rotational angular position of rotor relative to the "stator" or motor windings).

The rotor's angular position can be computed based on actual measured quantities using some type of speed or position sensor for control feedback measurement. For instance, to determine the angular position of the rotor, its angular speed can be measured with a speed sensor, and the angular position can then be obtained by integrating the speed measurements. Other systems may use a resolver and resolver-to-digital converter circuit which provides absolute position information directly. A high performance drive system requires a speed or position sensor which is an expensive component. Moreover, the circuitry required to process its signals can also be expensive. The presence of the speed/position sensor in the system adds cost, size, and weight, and reduces reliability as well. It would be desirable to eliminate this speed/position sensor and replace the measured quantities by computed estimates. It would also be desirable to eliminate mechanical interface hardware, reduce cost and weight, and improve the reliability of an electric traction drive system According to one approach for eliminating the sensor, the rotor's angular position can also be estimated without actually using a sensor to measure actual speed/position quantities. In this regard, there are numerous methods for estimation of the rotor's angular position that are suitable for zero/low speed operation.

Many common sensorless position control methods of a traction drive systems either rely on spatial variation of rotor saliency of a rotor of the drive system or back EMF of the inherent saliency machine of the drive system. These methods are more suitable with Interior Permanent Magnet Synchronous Motor (IPMSM), Synchronous Reluctance Motor and Switched Reluctance Motor machine types which inherently have magnetically salient rotors.

Other methods of detecting rotor angular position include high frequency signal injection and modified PWM test pulse excitation.

In the high frequency signal injection method, a balanced high frequency test signal, such as a voltage (or current) signal, can be injected on a stator winding of an inherently salient machine and the resultant effect of the balanced high frequency test signal on stator current (or voltage) can be measured. The effect of the balanced high frequency test signal injection can be observed in a measured stator current which takes the form of amplitude modulation at two times the fundamental frequency rate. This effect is due to the spatial modulation of the magnetic saliency as the rotor rotates. This method works quite well when the machine under test has inherent saliency, such as an Interior Permanent Magnet type machine. However, Surface Mount Permanent Magnet (SMPM) machines have no intentionally designed saliency and therefore require a very high magnitude injection signal in order to retrieve the position information. Thus, due to additional losses and noise generated by such a high magnitude injection signal, this method is not suitable for SMPM type application.

In the modified PWM test pulse excitation method, modified PWM test pulses can be used to excite the high frequency impedance of the machine. Modified PWM test pulses excite two types of saliencies: 1) mechanical saliency and 2) electrical saliency. When PWM test pulses are injected, the current control is ignored for the test period. This can be a good method for an industrial drive. However, a traction machine has low inductance and not controlling current during test period may result in an uncontrolled condition. This technique retrieves the position information from sensed stator current which must be sampled immediately after injecting the test pulses. This increases number of times the stator current is being sampled.

For example, such techniques have been described for use with induction motors in the following publications: "Sensorless position control of induction motors—an emerging technology," by Dr. J. Holtz, IEEE Trans. Ind. Electron., vol. 45, pp. 840-852, December 1998, and "Elimination of saturation effects in sensorless position controlled induction motors," by Dr. J. Holtz and H. Pan, Conf. Rec. IEEE-IAS Annu. Meeting, Pittsburgh, Pa., vol. 3, Oct. 13-18, 2002, pp. 1695-1702. These techniques modify standard PWM waveforms to excite each phase of the machine in turn such that an estimate of the rotor's angular position can be obtained. The technique has been shown to perform well on both asynchronous and synchronous machines alike.

While the conventional sensorless rotor angular position estimation techniques described above can provide a high fidelity estimate of the rotor position, there are some drawbacks. One such drawback relates to the increase in switching losses incurred in the semiconductor devices due to the introduction of test vectors injected within each PWM cycle or period. In general, prior conventional sensorless rotor angular position estimation techniques based upon PWM test pulse excitation double the switching losses compared to traditional SVPWM.

It is desirable to provide improved methods, systems and apparatus for sensorless rotor angular position estimation. For instance, it would be desirable to provide methods, systems and apparatus for sensorless rotor angular position estimation with reduced switching losses in the inverter module. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments of the present invention relate to methods and apparatus for low speed sensorless rotor angular position estimation implementing reduced switching loss PWM waveforms.

According to one embodiment a vector controlled motor drive system is provided that enables sensorless estimation of a rotor's angular position with reduced switching losses. The system includes an AC machine, an inverter module coupled to the AC machine, a test vector and duty cycle generator module coupled to the inverter module, a zero-sequence voltage generator module coupled to the AC machine and the inverter module, and an output module coupled to the zero-sequence voltage generator module.

The test vector and duty cycle generator module receives a set of three-phase voltage command signals and uses them to generate a set of pulse width modulated (PWM) waveforms. The set of PWM waveforms include first, second and third modified switching vector signals. The first modified switching vector signal corresponds to a first motor phase, the second modified switching vector signal corresponds to a second motor phase, and the third modified switching vector signal corresponds to a third motor phase.

The first, second and third modified switching vector signal are generated by injecting test pulses into PWM waveforms corresponding to conventional switching vector signals. Injecting test pulses into PWM waveforms causes additional transitions in the resulting modified switching vector signal, but as will be explained below, the modified switching vector signals in accordance with the disclosed embodiments exhibit a decreased number of transitions in comparison to switching vector signals that are used in conventional systems. For example, the first, second and third modified switching vector signal each have an amplitude value that changes between a high value and a low value during each PWM cycle, and over three consecutive PWM cycles, the number of transitions by the first modified switching vector signal between the low value and the high value (and vice-versa) is greater than six and less than twelve. Because the number of transitions is reduced, the number of times the switches in the inverter module switch during each PWM cycle are correspondingly reduced. As such, the disclosed embodiments can significantly reduce the switching losses incurred by the introduction or insertion of the test vectors into each PWM cycle, while maintaining full functionality in comparison to conventional sensorless rotor angular position estimation techniques.

The inverter module generates three-phase voltage signals based on the first, second and third modified switching vector signals received from the test vector and duty cycle generator module. The three-phase voltage signals drive the AC machine, which includes a rotor. The AC machine is designed to provide measurement access to the neutral voltage. The zero-sequence voltage generator module receives the three-phase voltage signals and the neutral voltage signal, and generates three sequentially sampled copies of the zero-sequence voltage. The output module receives the sampled three-phase zero-sequence voltages and generates a final estimated angular position of the rotor based on the sampled three-phase zero-sequence voltages.

In one implementation, the zero-sequence voltage generator module comprises a phase-to-neutral voltage generator module, a summing junction, and a zero sequence voltage sampling module. The phase-to-neutral voltage generator module receives the three-phase voltage signals and the neutral voltage signal, and based thereon, generates machine phase-to-neutral voltage signals that are provided to the summing junction. In response, the summing junction generates a zero-sequence voltage signal that it provides to the zero sequence voltage sampling module, which generates the sampled three-phase zero-sequence voltages based on the zero-sequence voltage signal.

In one implementation, the output module comprises a three phase-to-two phase conversion module, an angle calculator module, and optionally an angle scaling module. The three phase-to-two phase conversion module generate two-phase zero-sequence voltages based on the sequentially sampled three-phase zero sequence voltage signals. The angle calculator module receives the two-phase zero-sequence voltages and computes an arctangent angle of a vector represented by the two-phase zero-sequence voltages. The arctangent angle is the angle of the motor saliency being tracked and is proportional to the final estimated angular position of the rotor. In some implementations, the angle scaling module is used to scale the arctangent angle according to a scaling constant to generate the final estimated rotor angular position of the rotor.

Different embodiments of the first, second and third modified switching vector signals will now be described.

It should be noted that at any particular time during the three consecutive PWM cycles the first amplitude value of the first modified switching vector signal, the second amplitude value of the second modified switching vector signal and the third amplitude value of the third modified switching vector signal collectively define a particular voltage switching vector of a set of eight possible voltage switching vectors. These include a first zero voltage switching vector, a second zero voltage switching vector and six active voltage switching vectors. Each PWM cycle includes a first half of the PWM cycle and a second half of the PWM cycle. In particular, the first amplitude value of the first modified switching vector signal, the second amplitude value of the second modified switching vector signal and the third amplitude value of the third modified switching vector signal collectively define: the first zero voltage switching vector at a beginning portion of each of the three consecutive PWM cycles and at an end portion of each of the three consecutive PWM cycles, and define the second zero voltage switching vector in a middle portion of each of the three consecutive PWM cycles. The first zero voltage switching vector can be defined when the first amplitude value, the second amplitude value and the third amplitude value each have low amplitude values). The second zero voltage switching vector is defined when the first amplitude value, the second amplitude value and the third amplitude value each have high amplitude values. In the disclosed embodiments, the second zero voltage switching vector is defined continuously in each PWM cycle without intervening vectors.

In one embodiment, the first amplitude value, the second amplitude value and the third amplitude value further collectively define: a first active voltage switching vector in the first half of each PWM cycle, a second active voltage switching vector in the first half of each PWM cycle and following the first active voltage switching vector, a first test vector in the second half of each PWM cycle, and a second test vector in the second half of each PWM cycle and following the first test vector. The first test vector and the second test vector are complementary, and are defined between the second zero voltage switching vector and the first zero voltage switching vector without any other intervening vectors defined therebetween. In addition, the first active voltage switching vector and the second active voltage switching vector are defined between the first zero voltage switching vector (that is defined at the beginning portion of each of the three consecutive PWM cycles) and the second zero voltage switching vector without any other intervening vectors defined therebetween.

DESCRIPTION OF THE DRAWINGS

The present invention will hereinafter be described in conjunction with the following drawing figures, wherein like numerals denote like elements.

FIG. 3B is a table that summarizes the on/off status of each of the switches in FIG. 2 during each of the eight available voltage switching vectors (V0 ... V7);

DESCRIPTION OF AN EXEMPLARY EMBODIMENT

Figure 1:
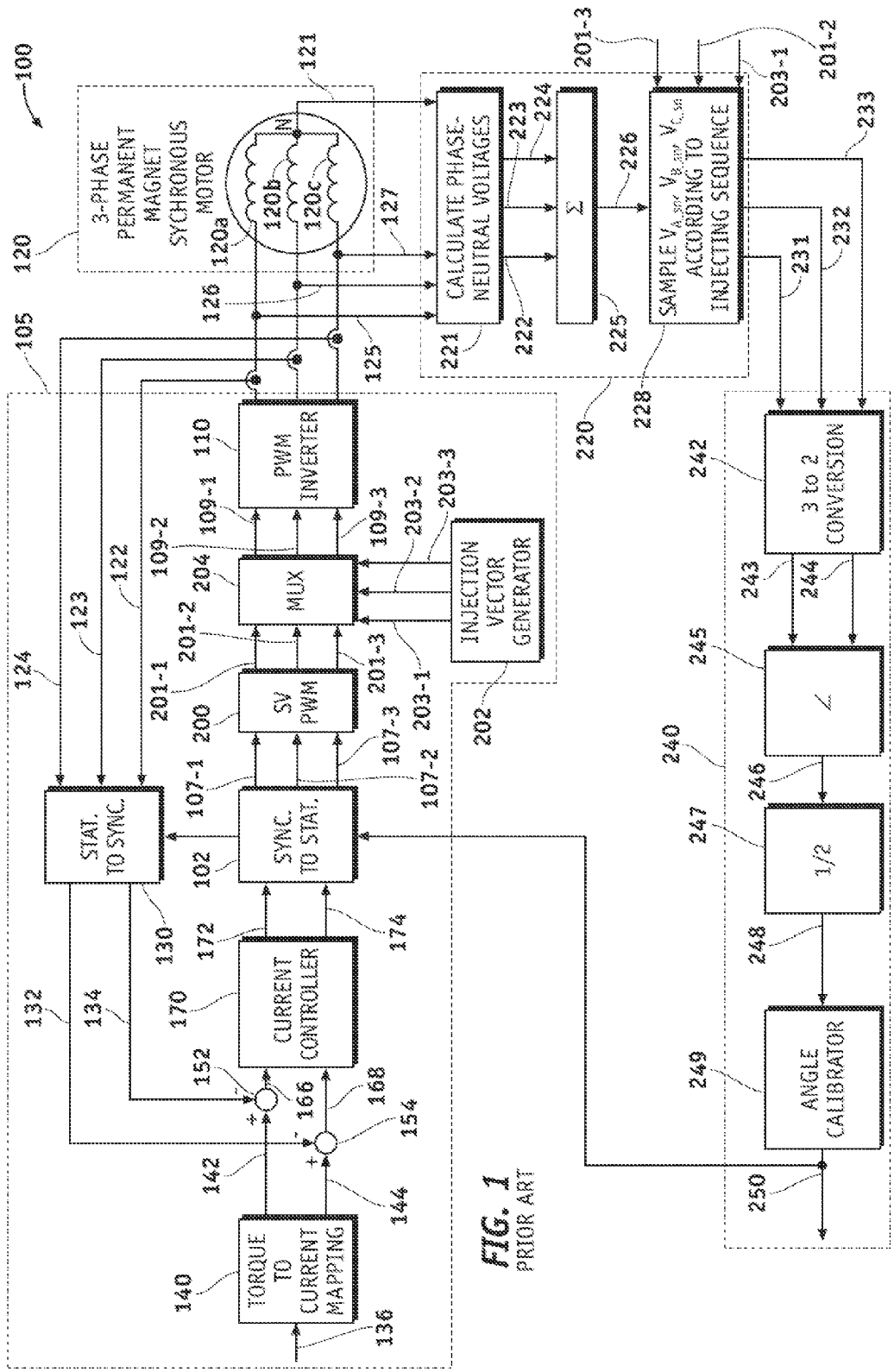
FIG. 1 is a block diagram of a conventional vector controlled motor drive system for high performance vector control with sensorless estimation of a rotor's angular position.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to low speed sensorless rotor angular position estimation that implement reduced switching loss PWM waveforms. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for low speed sensorless rotor angular position estimation that implement reduced switching loss PWM waveforms, as described herein. As such, these functions may be interpreted as steps of a method for low speed sensorless rotor angular position estimation that implements reduced switching loss PWM waveforms. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods and apparatus for low speed sensorless rotor angular position estimation that implement reduced switching loss PWM waveforms. The disclosed methods and apparatus can be implemented in operating environments such as a hybrid/electric vehicle (HEV). In the exemplary implementations which will now be described, the control techniques and technologies will be described as applied to a hybrid/electric vehicle (HEV). However, it will be appreciated by those skilled in the art that the same or similar techniques and technologies can be applied in the context of other systems which it is necessary to estimate angular position of a rotor while reducing switching losses. In this regard, any of the concepts disclosed here can be applied generally to "vehicles," and as used herein, the term "vehicle" broadly refers to a non-living transport mechanism having an AC motor. Examples of such vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "AC machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (i.e., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current (AC). An AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous. A synchronous AC motor rotates exactly at the supply frequency or a sub-multiple of the supply frequency. By contrast, an asynchronous (or induction) AC motor turns slightly slower than the supply frequency. The magnetic field on the rotor of this motor is created by an induced current. In implementations where the AC machine is a three-phase permanent magnet synchronous AC motor this should be understood to encompass Interior Permanent Magnet Synchronous Motor (IPMSM), Surface Mount Permanent Magnet Synchronous Motor (SMPMSM) and Reluctance Motors.

Overview

FIGS. 1-5B will provide a description of the operation of a conventional vector controlled motor drive system in which a rotor's angular position is estimated without using sensors as well as some of the drawbacks of this sensorless estimation technique.

FIG. 1 is a block diagram of a conventional vector controlled motor drive system 100 for high performance vector control with sensorless estimation of a rotor's angular position. The vector controlled motor drive system 100 can be used to control torque in a hybrid/electric vehicle (HEV). In this embodiment, the vector control module 105 of system 100 can be used to control a three-phase AC machine 120 via a three-phase pulse width modulated (PWM) inverter module 110 coupled to the three-phase AC machine 120 so that the three-phase AC machine 120 can efficiently use a DC input voltage (Vdc) available from the three-phase PWM inverter module 110 by adjusting current commands that control the three-phase AC machine 120.

In the following description of one particular non-limiting implementation, the three-phase AC machine 120 is described as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of AC machine.

The three-phase AC motor 120 is coupled to the three-phase PWM inverter module 110 via three inverter poles and generates mechanical power (Torque×Speed) based on three-phase sinusoidal voltage signals received from the PWM inverter module 110. As will be described below, the angular position of a rotor of the first three-phase AC motor 120 or "shaft position" is estimated without using a position sensor (not illustrated).

The vector control motor drive system 100 includes a vector control module 105, a motor 120, a voltage generator module 220, and an output module 240.

The stator vector control module 105 receives a torque command (T*e) and generates three-phase voltage commands (Vap ... Vcp). Components or modules which may be used to implement the vector control module 105 can include a torque-to-current mapping module 140, summer junctions 152 and 154, a current-controller module 170, a synchronous-to-stationary conversion module 102, a Space Vector (SV) PWM module 200, an test vector generator module 202, a multiplexer module 204, a PWM inverter 110, and a stationary-to-synchronous conversion module 130.

The torque-to-current mapping module 140 receives the torque command (T*e) and generates the d-axis current command (Idse*) 142 and the q-axis current command (Iqse*) 144. In particular, the torque-to-current mapping module 140 receives a torque command signal (Te*) 136 that is input from a user of the system 100, speed (ω) of the shaft that is generated based on the derivative of the shaft position output (θ_rEst), the DC input voltage (Vdc) as inputs and possibly a variety of other system parameters depending upon implementation. The torque-to-current mapping module 140-A uses the inputs to map the torque command signal (Te*) 136 to a d-axis current command signal (Ids_e*) 142 and a q-axis current command signal (Iqs_e*) 144. The mapping can be calculated for a permanent magnet machine using motor parameters and the following equation.

$$T = \frac{3}{2} \cdot \frac{P}{2} \cdot [k_e \cdot I_{qs} - (L_q - L_d) \cdot I_{qs} \cdot I_{ds}]$$

for $I_{ph} \leq I_{max}$ and $V_{ph} \leq K \cdot V_{max}$, where $I_{ph} = \sqrt{I_{ds}^2 + I_{qs}^2}$, the Ids and Iqs currents are calculated such that torque per ampere is maximized.

The stationary-to-synchronous conversion module 130 receives resultant stator current (Ias, Ibs, Ics) 122, 123, 124 that are measured phase currents from motor 120 and the final estimated rotor position angle (θr_est) 250 and processes these stator currents 122-124 to generate a feedback d-axis current signal (Ids_e) 132 and a feedback q-axis current signal (Iqs_e) 134, which are supplied to the summing junctions 152 and 154 to generate the current errors (Idserror_e and Iqserror_e), as will be described below. The output of the stationary-to-synchronous conversion module 130 can also be called synchronous reference frame current signals (Iqs_e, Ids_e) 132, 134. The process of stationary-to-synchronous conversion can be performed using Clarke and Park Transformations that are well-known in the art and for sake of brevity will not be described in detail. One implementation of the Clarke and Park Transformations is described in "Clarke & Park Transforms on the TMS320C2xx," Application Report Literature Number: BPRA048, Texas Instruments, 2007, which is incorporated by reference herein in its entirety.

The current mapping module 140 is coupled to summer junctions 152 and 154, which are coupled to a current controller module 170 and receive the output of the stationary-to-synchronous conversion module 130.

Upon receiving the d-axis current command signal (Ids_e*) 142 and the feedback d-axis current signal (Ids_e) 132, the summing junction 152 subtracts the feedback d-axis current signal (Ids_e) 132 from the d-axis current command signal (Ids_e*) 142 to generate a d-axis current error signal (Idserror_e) 166. Similarly, upon receiving the q-axis current command signal (Iqs_e*) 144 and the feedback q-axis current signal (Iqs_e) 134, the summing junction 154 subtracts the feedback q-axis current signal (Iqs_e) 134 from the q-axis current command signal (Iqs_e*) 144 to generate a q-axis current error signal (Iqserror_e) 168.

The current controller module 170 receives the d-axis current error signal (Idserror_e) 166 and the q-axis current error signal (Iqserror_e) 168 and uses these signals to generate a d-axis voltage command signal (Vds_e*) 172 and a q-axis voltage command signal (Vqs_e*) 174 that are used to control or regulate current. The process of current to voltage conversion can be implemented as a Proportional-Integral (PI) controller, which is well-known in the art and for sake of brevity will not be described in detail.

The synchronous-to-stationary conversion module 102 receives inputs from the current controller module 170 and the angle calibrator module 249, and generates outputs sent to the Space Vector PWM module 200. In particular, the synchronous-to-stationary conversion module 102 receives the d-axis voltage command signal (Vds_e*) 172 and the q-axis voltage command signal (Vqs_e*) 174 and the final estimated rotor position angle (θr_est), and based on these signals, generates a three-phase sinusoidal voltage command (Va*) 107-1, a three-phase sinusoidal voltage command (Vb*) 107-2, and a three-phase sinusoidal voltage command (Vc*) 107-3. The process of synchronous-to-stationary conversion is done using inverse Clarke and Park Transformations that are well-known in the art and for sake of brevity will not be described in detail. One implementation of the inverse Clarke and Park Transformations is described in the above referenced document "Clarke & Park Transforms on the TMS320C2xx."

The Space Vector (SV) PWM module 200 is used for the control of pulse width modulation (PWM). As described above, the SVPWM module 200 receives the three-phase sinusoidal voltage commands (Va*) 107-1, (Vb*) 107-2, (Vc*) 107-3 from the synchronous-to-stationary conversion module 102, and uses these signals to generate switching vector signals (Sa) 201-1, (Sb) 201-2, (Sc) 201-3, which it provides to multiplexer 204. The particular SV modulation algorithm implemented in the SV PWM module 200 can be any known SV modulation algorithm.

The test vector generator 202 can generate waveforms (Sia . . . Sic) 203-1 . . . 203-3 of test pulses 301 . . . 306, and the multiplexer 204 receives switching vector signals (Sa . . . Sc) 201 from the Space Vector PWM module 200 and waveforms (Sia . . . Sic) 203 from the test vector generator module 202 and multiplexes these inputs to modify the switching vector signals (Sa . . . Sc) 201 and generates modified switching vector signals (Sa' . . . Sc') 109 for the PWM inverter 110. The modified switching vector signals (Sa' . . . Sc') 109 control the switching states of switches in PWM inverter 110 to generate three phase sinusoidal voltage commands. The switching vector signals (Sa . . . Sc) 201, test pulses (Sia . . . Sic) 203 and the modified switching vector signals (Sa' . . . Sc') 109 are described below with reference to FIGS. 3A-5B.

The three-phase PWM inverter module 110 is coupled to the multiplexer module 204. The three-phase PWM inverter module 110 receives the DC input voltage (Vdc) and modified switching vector signals (Sa' . . . Sc') 109, and uses them to generate alternating current (AC) waveforms called three-phase voltage signals (Vap . . . Vcp) 125-127 at inverter poles that drive the three-phase AC machine/motor 120 at varying speeds.

The three-phase permanent magnet synchronous motor 120 receives the three-phase voltage signals (Vap . . . Vcp) 125-127 generated by the PWM inverter 110 and generates a motor output (Vn) 121 and the commanded torque Te*. In this one particular implementation, the motor 120 comprises a three-phase permanent-magnet synchronous motor (PMSM) 120. The resultant stator currents (Ias, Ibs and Ics) are sensed, sampled and provided to the stationary-to-synchronous conversion module 130. Although not illustrated in FIG. 1, the system 100 may also include a gear coupled to and driven by the three-phase AC motor 120 shaft and the three-phase AC machine 120 shaft.

As illustrated in FIG. 1, there is no speed/position sensor present in the motor 120. Instead, the rotor's angular position can estimated without actually using a sensor. This is known as "sensorless estimation." As will be described below, sensorless estimation of the rotor's angular position involves measuring the zero sequence voltage signal ($V_{sn}$) 226 of the motor 120, which will necessarily include some information about the rotor's angular position due to saliency of the motor 120. In some cases, the saliency is an intentional design feature of the motor 120, such as found in synchronous reluctance or interior permanent magnet machines. In other cases, the saliency could be due to a secondary effect, such as rotor bar slotting in the rotor of an induction machine. Further operational details of sensorless operation will now be described with reference to FIGS. 1-5.

The voltage generator module 220 receives the three-phase voltage signals (Vap . . . Vcp) 125-127 and the motor output neutral voltage (Vn) 121 from the three-phase permanent magnet synchronous motor 120 and generates three sequentially sampled three-phase zero-sequence voltages (VA_sn ... VC_sn) 231-233. Components or modules which may be used to implement the voltage generator module 220 include a phase-to-neutral voltage generator module 221, a summing junction 225, and a zero sequence voltage sampling module 228.

The phase-neutral voltage calculator module 221 receives the three-phase voltage signals (Vap ... Vcp) 125-127 feedback from the three-phase voltage source inverter 110 and a motor neutral point voltage signal ($V_n$) 121 feedback from a motor neutral point (N) of the motor 120. Based on the motor neutral point voltage signal ($V_n$) 121 and pole voltage signals (Vap ... Vcp) 125-127, the phase-neutral voltage calculator module 221 calculates phase-to-neutral voltage signals (Van ... Vcn) 222-224 with respect to the neutral point (N) (also referred to as the machine's terminal phase voltages or machine's phase voltages), which are then provided to the summing junction 225.

The summing junction 225 receives the machine phase-to-neutral voltage signals (Van ... Vcn) 222-224 and combines/sums them to generate the zero-sequence voltage signal (Vsn) 226. The zero sequence voltage ($V_{sn}$) is supplied to zero sequence voltage sampling module 228. In one implementation, the summing junction 225 is implemented using analog circuitry that sums the phase-to-neutral voltage signals (Van ... Vcn) 222-224 to generate the zero-sequence voltage signal (Vsn) 226.

The zero sequence voltage sampling module 228 receives the zero-sequence voltage (Vsn) 226 and samples the zero-sequence voltage (Vsn) 226 according to an test pulse sequence received from Injection Vector Generator 202 to generate sequentially sampled three-phase zero-sequence voltage signals (VA_sn ... VC_sn) 231-233. The zero sequence voltage sampling module 228 samples the zero sequence voltage ($V_{sn}$) according to injecting sequence to align the sample with the injected test pulse vector and generates the sequentially sampled three-phase zero sequence voltage signals (VA_sn ... VC_sn) 231-233 for each of the three, which are then supplied to a three phase-to-two phase conversion module 242 for three phase to two phase conversion, as will be described below. To explain further, the motor 120 is excited with special test voltage pulses, which will be described in detail below with reference to FIGS. 3-8. One motor phase A 120a, B 120b, or C 120c is tested during each PWM cycle or period. In other words, in each PWM period the test pulse sequence is being aligned with one of the three phases. Each of the three phases A, B, C will be tested once in any three successive PWM periods. During the test pulse, the zero sequence voltage signal ($V_{sn}$) 226 can be sampled using an analog-to-digital converter, and sampling module can sequentially sample three separate zero sequence voltage signals (VA_sn ... VC_sn) 231-233. Each of the three sequentially sampled three-phase zero sequence voltage signals (VA_sn ... VC_sn) 231-233 are updated every third PWM period. To explain further, the zero-sequence voltage signal (Vsn) 226 includes zero-sequence information for each motor phase. The sampling module will output one of the three sequentially sampled zero sequence voltage signals (VA_sn ... VC_sn) 231-233 at any particular time, depending on which test pulse sequence is being injected by sampling module 228 during a particular sample period (i.e., at any particular time, the zero-sequence voltage signal (Vsn) 226 includes zero-sequence information for a particular motor phase being tested). For example, if test vectors (V1, V4) 301/304 are injected, then the zero-sequence voltage signal (Vsn) 226 represents a zero sequence voltage for phase A (VA_sn) 231, and if test vectors (V3, V6) 303/306 are injected, then the zero-sequence voltage signal (Vsn) 226 represents a zero sequence voltage for phase B (VB_sn) 232, and if test vectors (V2, V5) 303/305 are injected, then the zero-sequence voltage signal (Vsn) 226 represents a zero sequence voltage for phase C (VC_sn) 233. Sampling can be triggered toward the end of the test vectors aligned with the positive phase axes a, b, c. The sampling instant is coordinated with the test pulses. For instance, in FIG. 5B, the sample is triggered toward the end of test vectors V1, V3, and V5. Alternatively, sampling can be triggered towards the end of the test vectors V4, V6, and V2.

The output module 240 receives sampled three-phase zero-sequence voltages (VA_sn ... VC_sn) 231-232, and generates the final estimated rotor position angle ($\theta r\_est$) 250. As will be explained below in more detail, these three sequentially sampled three-phase zero sequence voltage signals (VA_sn ... VC_sn) 231-233 are spatially phase shifted (120 electrical degrees) from each other. Thus, by performing a park transformation on the three sequentially sampled three-phase zero sequence voltage signals (VA_sn ... VC_sn) 231-233 at three phase-to-two phase conversion module 242, stationary reference frame or two-phase zero-sequence voltage signals (VAlpha_sn, VBeta_sn) 244 are generated that are 90 degrees phase sifted from each other, and therefore, by applying angle calculator module 245 that computes an arctangent angle, rotor angular position information can be estimated.

Components or modules which may be used to implement the output module 240 include a three phase-to-two phase conversion module 242, an angle calculator module 245 that computes an arctangent angle, an angle converter module 247, and an angle calibrator module 249.

The three phase-to-two phase conversion module 242 receives the sampled three-phase zero-sequence voltage signals (VA_sn ... VC_sn) 231-232 and converts them to an equivalent set of two-phase zero-sequence voltage signals (VAlpha_sn, VBeta_sn) 244 using a three-to-two phase transformation, which are then provided to the angle calculator module 245.

The angle calculator module 245 receives two-phase zero-sequence voltages (VAlpha_sn, VBeta_sn) 243, 244 and use them to generate angle of the saliency 246 by performing an arctangent computation, which calculates the angle of the vector represented by the two-phase zero-sequence voltages (VAlpha_sn, VBeta_sn) 243, 244. The output 246 of the angle calculator module 245 is the angle of the motor saliency being tracked, and is proportional to angular position ($\hat{\theta}r$) of the rotor.

In some implementations, depending upon the motor saliency being tracked, the angle may need to be scaled to convert the angle to electrical degrees so that it can be used by the vector control module 105. In such implementations, the angle converter module 247 scales or converts the angle to electrical degrees and generates output ($\theta\_EstRaw$) 248. For example, in the case of an interior permanent magnet motor, the angle is twice the fundamental frequency of the motor (e.g., the 2*fe harmonic), and the angle converter module 247 divides its input by two. In this particular implementation, the angle converter module 247 receives the angle of the saturation induced saliency 246 and generates rotor position angle ($\theta EstRaw$) 248 by dividing this signal by two (2). In some implementations the angle calibrator module 249 receives rotor position angle ($\theta EstRaw$) 248 and generates the final estimated rotor position angle ($\theta r\_est$) 250.

Prior to describing operation details of the SVPWM module 200, test vector generator module 202, multiplexer module 204, and PWM inverter 110, a more detailed description of one possible implementation of the three-phase voltage source inverter 110 will be provided including how it is connected to the three phase motor 120.

Figure 2:
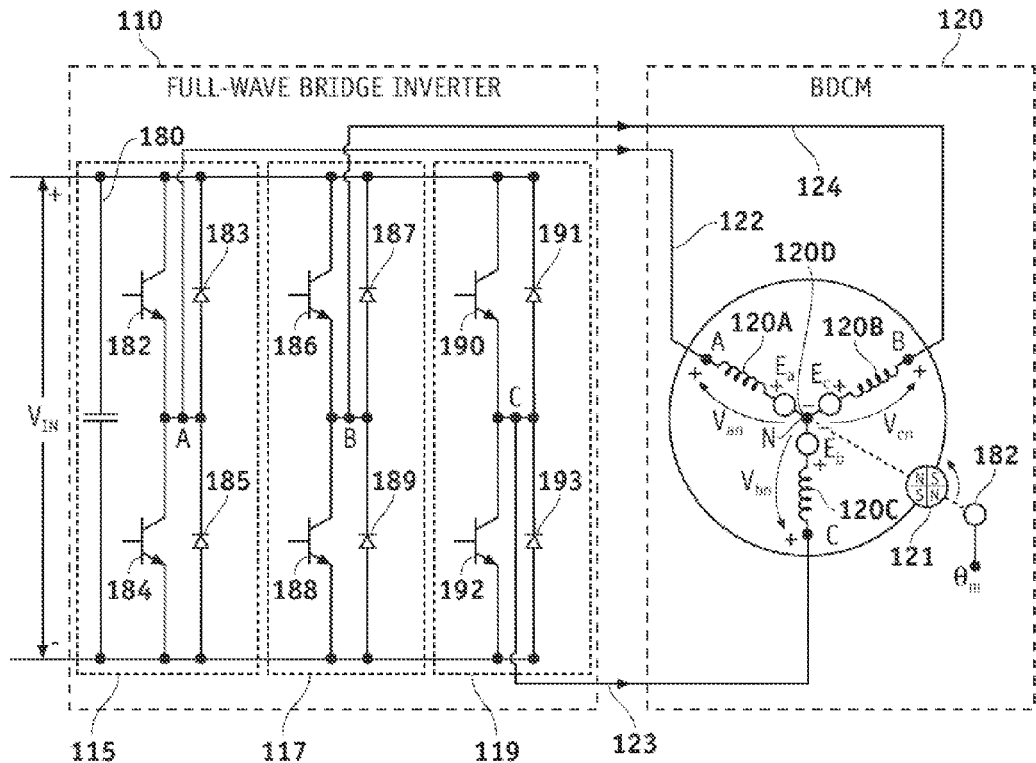
FIG. 2 is a block diagram of a portion of a motor drive system including a three-phase voltage source inverter connected to a three phase motor.

FIG. 2 is a block diagram of a portion of a motor drive system including a three-phase voltage source inverter 110 connected to a three phase motor 120. It should be noted that the three-phase voltage source inverter 110 and the three phase motor 120 in FIG. 1 are not limited to this implementation; rather, FIG. 2 is merely one example of how the three-phase voltage source inverter 110 and the three phase motor 120 in FIG. 1 could be implemented in one implementation.

As illustrated in FIG. 2, a particular type of three-phase AC motor 120 that can be referred to as a star-connected (or Y-connected) three-phase electric motor 120, and a three-phase PWM inverter module 110 (that can be referred to as a full-wave bridge inverter 110) are illustrated.

As illustrated in FIG. 2, the three-phase AC motor 120 has three stator or motor windings 120a, 120b, 120c connected in a wye-configuration between motor terminals A, B, and C, and the three-phase PWM inverter module 110 includes a capacitor 180 and three inverter sub-modules 115, 117, 119. In this embodiment, in phase A the inverter sub-module 115 is coupled to motor winding 120a, in phase B the inverter sub-module 117 is coupled to motor winding 120b, and in phase C the inverter sub-module 119 is coupled to motor winding 120c. The motor windings A, B, C (120a, 120b, 120c) that are coupled together at a neutral point (N) 120d. The current into motor winding A 120a flows out motor windings B 120b and C 120c, the current into motor winding B 120b flows out motor windings A 120a and C 120c, and the current into motor winding C 120c flows out motor windings A 120a and B 120b.

Phase currents (i.e., first resultant stator current (I_as) 122, second resultant stator current (I_bs) 123, and third resultant stator current (I_cs) 124) flow through respective stator windings 120a, 120b, and 120c. The phase to neutral voltages across each of the stator windings 120a-120c are respectively designated as $V_{an}$, $V_{bn}$, $V_{cn}$, with the back EMF voltages generated in each of the stator windings 120a-120c respectively shown as the voltages $E_a$, $E_b$, and $E_c$ produced by ideal voltage sources each respectively shown connected in series with stator windings 120a-120c. As is well known, these back EMF voltages $E_a$, $E_b$, and $E_c$ are the voltages induced in the respective stator windings 120a-120c by the rotation of permanent magnet rotor. Although not shown, the motor 120 is coupled to a drive shaft.

The full-wave bridge inverter 110 includes a capacitor 180, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, full-wave bridge inverter 110 has six solid state switching devices 182, 184, 186, 188, 190, 192 and six diodes 183, 185, 187, 189, 191, 193 to appropriately switch compound voltage ($V_{IN}$) and provide three-phase energization of the stator windings 120a, 120b, 120c of the three-phase AC motor 120.

Although not illustrated, a closed loop motor controller can receive motor command signals and motor operating signals from the motor 120, and generate control signals for controlling the switching of solid state switching devices 182, 184, 186, 188, 190, 192 within the inverter sub-modules 115, 117, 119. Examples of these control signals will be described below with reference to FIGS. 4A through 5B and 7A-9B. By providing appropriate control signals to the individual inverter sub-modules 115, 117, 119, the closed loop motor controller controls switching of solid state switching devices 182, 184, 186, 188, 190, 192 within the inverter sub-modules 115, 117, 119 and thereby control the outputs of the inverter sub-modules 115, 117, 119 that are provided to motor windings 120a, 120b, 120c, respectively. The first resultant stator current (I_as) 122, the second resultant stator current (I_bs) 123, and the third resultant stator current (I_cs) 124 that are generated by the inverter sub-modules 115, 117, 119 of the three-phase inverter module 110 are provided to motor windings 120a, 120b, 120c. The voltages as $V_{an}$, $V_{bn}$, $V_{cn}$, $E_a$, $E_b$, and $E_c$ and the voltage at node N fluctuate over time depending on the open/close state of switches 182, 184, 186, 188, 190, 192 in the inverter sub-modules 115, 117, 119 of the inverter module 110, as will be described below.

Prior to describing further details of conventional sensorless rotor angle/position estimation techniques with reference to FIGS. 5A-5B, a conventional center-based SVPWM method will be described with reference to FIGS. 3-4B.

Voltage Switching Vectors

Space Vector Pulse Width Modulation (SVPWM) is a technique used for the control of pulse width modulation (PWM), and is used for the creation of alternating current (AC) waveforms to drive three-phase AC powered motors at varying speeds from DC.

Figure 3A:
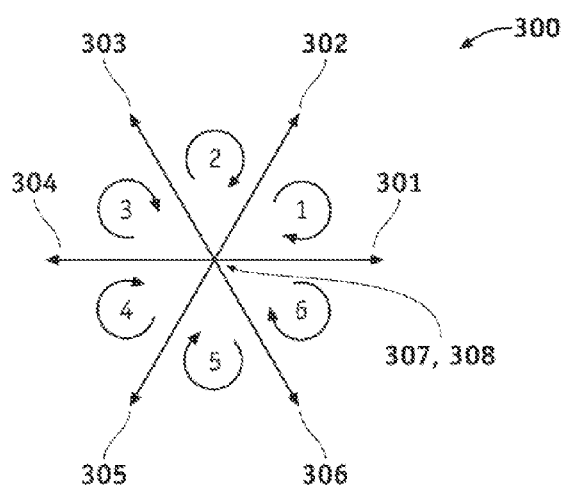
FIG. 3A is a voltage switching vector diagram that illustrates eight available voltage switching vectors (V0 ... V7) for driving switches in the three-phase voltage source inverter module in FIG. 2.

FIG. 3A is a voltage switching vector diagram 300 that illustrates eight available voltage switching vectors (V0 ... V7) 301 ... 308 for driving switches in a three-phase voltage source inverter module 110 in FIG. 2. FIG. 3B is a table that summarizes the on/off status of each of the switches in FIG. 2 during each of the eight available voltage switching vectors (V0 ... V7) 301 ... 308.

The three-phase voltage source inverter module 110 must be controlled so that at no time are both switches in the same inverter sub-module 115, 117, 119 or "leg" are turned on or else the DC supply would be shorted. As such, the switches in the same inverter sub-module 115, 117, 119 are operated such that when one is off the other is on and vice versa. As illustrated in FIG. 3A and as summarized in FIG. 3B, this leads to eight possible voltage switching vectors (V1 ... V7) 301 ... 308 for the inverter 110 with six active voltage switching vectors (V1 through V6) 301-306 and two zero voltage switching vectors (V0 and V7) 307, 308. Each voltage switching vector (V0 ... V7) is used to represent the switching status of switches of the three-phase voltage source inverter 110 in FIG. 2. In other words, each of the eight voltage switching vectors (V1 ... V7) 301 ... 308 represents a different combination of possible switch states of the switches 182, 184, 186, 188, 190, 192 in the three-phase voltage source inverter 110. To explain further, in a given phase at any particular time, one of the switches is off and the other one of the switches is on (i.e., the two switches in a particular inverter sub-module must have opposite on/off states). For instance, with respect to phase A, when switch 182 is on, switch 184 is off, and vice-versa. As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0). For example, with respect to phase A, when the upper switch 182 is on (and the lower switch 184 is off) the value of the first bit (from left to right) will be one (1).

Accordingly, each of the voltage switching vectors (V1 ... V7) 301 ... 308 is illustrated along with a corresponding three bit binary number in the parenthesis next to each voltage switching vector identifier (V1 ... V7) that identifies a corresponding switch state associated with that particular voltage switching vectors (V1 ... V7) 301 ... 308.

The first bit (from left to right) represents the state of the switches 182, 184 for inverter sub-module 115 for phase A, the second bit (from left to right) represents the state of the switches 186, 186 for inverter sub-module 117 for phase B, and the third bit (from left to right) represents the state of the switches 190, 192 for inverter sub-module 119 for phase C.

Thus, the active voltage switching vector (V1) 301 represents a case when, with respect to phase A, when the upper switch 182 is on (and the lower switch 184 is off) and the value of the first bit (from left to right) will be one (1), with respect to phase B, when the upper switch 186 is off (and the lower switch 188 is on) and the value of the second bit (from left to right) will be zero (0), and with respect to phase C, when the upper switch 190 is off (and the lower switch 192 is on) and the value of the third bit (from left to right) will be zero (0). Hence, the active voltage switching vector (V1) 301 has a corresponding switch state bit pattern (100). In other words, the switch state represented by voltage switching vector (V1) 301 is (100), meaning phase A is high, while phases B and C are low.

Likewise, the active voltage switching vector (V2) 302 represents a case when, with respect to phase A, when the upper switch 182 is on (and the lower switch 184 is off) and the value of the first bit (from left to right) will be one (1), with respect to phase B, when the upper switch 186 is on (and the lower switch 188 is off) and the value of the second bit (from left to right) will be one (1), and with respect to phase C, when the upper switch 190 is off (and the lower switch 192 is on) and the value of the third bit (from left to right) will be zero (0). Hence, the active voltage switching vector (V2) 302 has a corresponding switch state bit pattern (110).

The zero voltage switching vector (V0) 308 represents a case when, with respect to phase A, when the upper switch 182 is off (and the lower switch 184 is on) and the value of the first bit (from left to right) will be zero, with respect to phase B, when the upper switch 186 is off (and the lower switch 188 is on) and the value of the second bit (from left to right) will be zero (0), and with respect to phase C, when the upper switch 190 is off (and the lower switch 192 is on) and the value of the third bit (from left to right) will be zero (0). Hence, the zero voltage switching vector (V0) 308 has a corresponding switch state bit pattern (000), which indicates that all of the upper switches in all three phases A, B,C are off and that all of the lower switches in all three phases A, B,C are on.

Similarly, the zero voltage switching vector (V7) 307 has a corresponding switch state bit pattern (111), which indicates that all of the upper switches in all three phases A, B,C are on and that all of the lower switches in all three phases A, B,C are off.

The zero sequence voltage signal ($V_{sn}$) 226 of FIG. 2 is dependent on both the inductance variance and the inverter configuration due to switching status. The zero sequence voltage profile corresponding to each switching status is described in United States Patent Application Publication Number 2007/0132415 A1 entitled "Method and Apparatus for sensorless position control of a permanent magnet synchronous motor (PMSM) drive system," filed Dec. 14, 2005, which is incorporated by reference herein in its entirety US 2007/0132415 A1 also describes possible three phase stator winding configurations of stator windings with respect to the switching vectors shown in FIG. 3A.

The voltage switching vector diagram 300 includes six (6) sectors with sector numbers (1 . . . 6) increasing in the counter-clockwise direction. Each of the sectors is defined between two of the six active voltage switching vectors (V1 through V6) 301-306. These six sectors are used to control the switching of switches (e.g., IGBT devices) in the PWM inverter 110 to control the current in the motor 120 based on the operating conditions.

As will be described further below, in each PWM cycle, the two most adjacent active voltage switching vectors (i.e., those bounding the sector) for any particular sector and the two zero voltage switching vectors (V0 and V7) 307, 308 can be used along with test vectors to generate PWM waveforms called modified switching vector signals (Sa*, Sb* and Sc*) 109-1, 109-2, 109-3 (FIG. 5B) or (Da*, Db* and Dc*) 209-1, 209-2, 209-3 (FIGS. 7B, 8B, 9B) for phases A, B and C, respectively. The modified switching vector signals are provided to the gates (Ga . . . Gf) of the switches 182, 184, 186, 188, 190, 192 in the three-phase voltage source inverter 110 in FIG. 2 to control switching of the switches 182, 184, 186, 188, 190, 192.

Basic Space Vector PWM (SVPWM) Waveforms

Figure 4A:
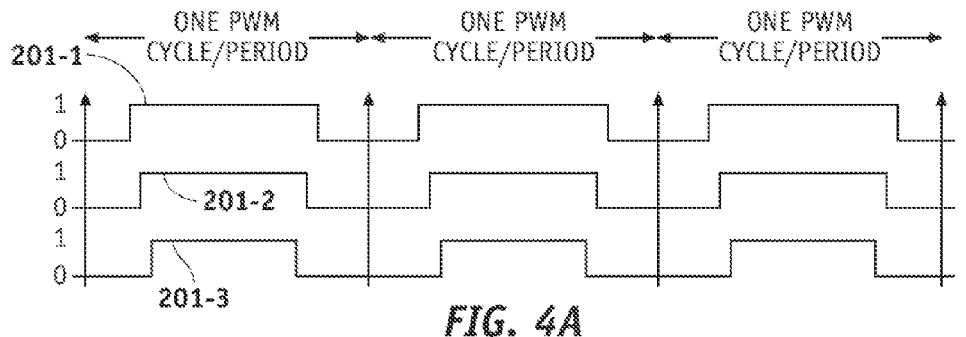
FIG. 4A is a graph that shows three PWM cycles of conventional Space Vector PWM (SVPWM) waveforms of switching vector signals (Sa, Sb and Sc) used in conventional center-based SVPWM for current control in sector one (1)
Figure 4B:
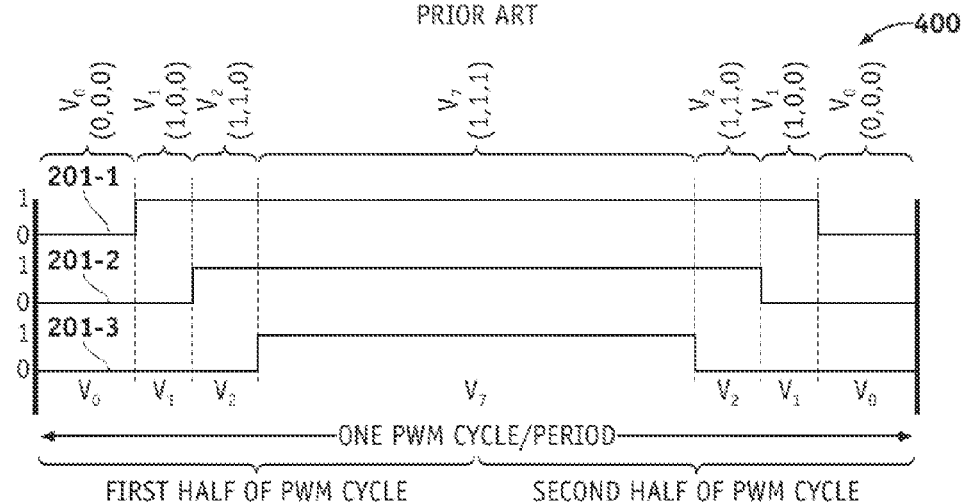
FIG. 4B is a graph that shows the first PWM cycle of FIG. 4A in greater detail.
Figure 5A:
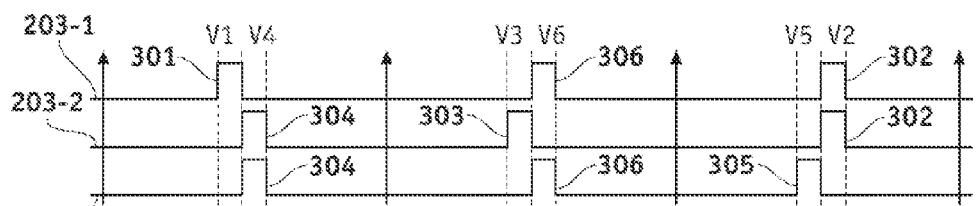
FIG. 5A is a graph showing PWM waveforms (Sia, Sib and Sic) that include complementary test vectors used in accordance with the conventional sensorless position estimation technique.
Figure 5B:
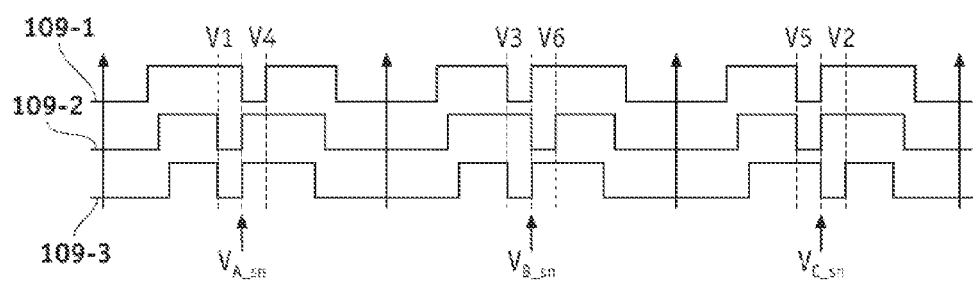
FIG. 5B is a graph showing synthesized PWM waveforms of the modified switching vector signals (Sa*, Sb* and Sc*) used in accordance with the conventional sensorless position estimation technique.

Prior to describing conventional waveforms of the modified switching vector signals (Sa*, Sb* and Sc*) 109-1, 109-2, 109-3 that are used in a conventional sensorless position estimation technique with reference to FIG. 5B, a brief description of how a general Space Vector PWM (SVPWM) waveforms of switching vector signals (Sa, Sb and Sc) 201 will now be provided with respect to FIGS. 4A and 4B to illustrate how the eight voltage switching vectors (V1 . . . V7) 301 . . . 308 can be used to construct a portion (one PWM cycle) of one of these conventional SVPWM waveforms in sector one (1). This will help provide a basic introduction to conventional SVPWM waveforms that will help explain how conventional waveforms of modified switching vector signals (Sa*, Sb* and Sc*) 109-1, 109-2, 109-3 (that are used in a conventional sensorless position estimation technique) are constructed.

FIG. 4A is a graph that shows three PWM cycles of conventional Space Vector PWM (SVPWM) waveforms of switching vector signals (Sa, Sb and Sc) 201-1 . . . 201-3 used in conventional center-based SVPWM for current control in sector one (1). FIG. 4B is a graph 400 that shows how the SVPWM waveforms of switching vector signals (Sa, Sb and Sc) 201 are constructed during the first PWM cycle of FIG. 4A. In FIG. 4B the first PWM cycle of the conventional Space Vector PWM (SVPWM) waveforms of switching vector signals (Sa, Sb and Sc) 201-1, 201-2, 201-3 for phases A, B and C, respectively, are illustrated. The waveforms of the switching vector signals (Sa, Sb and Sc) 201-1, 201-2, 201-3 illustrated in FIGS. 4A and 4B are those corresponding to sector one (1) in FIG. 3, which is bounded by active voltage switching vector (V1) (100) 301 and active voltage switching vector (V2) (110) 302. The active voltage switching vector (V1) (100) 301 will have one phase high and the other two low (i.e., will have one switch in the high state), while the active voltage switching vector (V2) (110) 302 will have two phases high and the other low (i.e., will have two switches in the high state).

As illustrated in FIG. 4B, the first PWM cycle starts with zero voltage switching vector (V0) 308. The next vector is the adjacent active voltage switching vector (V1) (100) 301 with one phase in the high state. Next, the active voltage switching vector (V2) (110) 302 with two phases in the high state is used. The center of the PWM period is the zero voltage switching vector (V7) 307. The second half of the PWM cycle is a mirror image of the first half.

Notably, the active voltage switching vectors (V1, V2) 301, 302 have been "split into two," with one half of each active voltage switching vectors (V1, V2) 301, 302 on either side of the center zero voltage switching vector (V7) 307. From the waveforms of the switching vector signals (Sa, Sb and Sc)

201-1, 201-2, 201-3 in FIG. 4B, it can be seen that each phase experiences two switch on/off (or off/on) transitions per PWM cycle. Each of these switch transitions introduces unwanted switching losses in the switches 182, 184, 186, 188, 190, 192 in the three-phase voltage source inverter 110.

Having described a conventional center-based SVPWM method with reference to FIGS. 3-4B, further details of conventional sensorless rotor angle/position estimation techniques will now be described with reference to FIGS. 5A-5B. In particular, a method will be described with reference to FIGS. 5A-5B for modifying the general SVPWM waveforms of switching vector signals (Sa, Sb and Sc) (illustrated in FIGS. 4A and 4B) to generate conventional waveforms of the modified switching vector signals (Sa*, Sb* and Sc*) 109-1 . . . 109-3 that are used in a conventional sensorless position estimation technique.

Waveforms of the Switching Vector Signals (Sa* Sb* and Sc*) that are Used in a Conventional Sensorless Position Estimation Technique FIG. 5A is a graph showing PWM waveforms 203-1 . . . 203-3 (Sia, Sib and Sic) that include complementary test pulses 301 through 306 used in accordance with a conventional sensorless position estimation technique. The PWM waveforms (Sia, Sib and Sic) 203-1 . . . 203-3 and the test pulses 301 through 306 are ultimately used to generate zero sequence voltages 231-233 that are measured by zero sequence voltage signal (V_sn) 226. The test pulses 301 through 306 define a pair of complementary test vectors (V1/V4; V3/V6; V5/V2) in each PWM cycle/period.

FIG. 5B is a graph showing synthesized PWM waveforms of the modified switching vector signals (Sa*, Sb* and Sc*) 109-1 . . . 109-3 that are used to drive the gates (Ga . . . Gf) of switches 182, 184, 186, 188, 190, 192 in the three-phase voltage source inverter 110 in accordance with the conventional sensorless position estimation technique. As in FIG. 4B, the waveforms in FIGS. 5A and 5B are those corresponding to sector one (1) in FIG. 3; however, in contrast to FIG. 4B it is noted that three PWM cycles are illustrated (as opposed to one PWM cycle in FIG. 4B). It should be appreciated that there can be several different choices in the sequence of the test pulses and the position of test pulses. In this example, the test pulses of waveforms (Sia, Sib and Sic) 203 are positioned at the center of the zero vector (V7) (1,1,1) in the SVPWM waveforms. The two complementary vectors (V1-V4, V3-V5 and V5-V2) are injected sequentially to minimize the deviation of motor currents.

The test pulses of waveforms (Sia, Sib and Sic) 301 . . . 306 of FIG. 5A are multiplexed with the waveforms of the switching vector signals (Sa, Sb and Sc) 201-1, 201-2, 201-3 in FIG. 4B to generate modified switching vector signals (Sa*, Sb* and Sc*) 109-1 . . . 109-3 of FIG. 5B that are used to drive the gates (Ga . . . Gf) of switches 182, 184, 186, 188, 190, 192 of the three-phase voltage source inverter 110 according to a switching pattern that will generate three-phase voltage signals ($V_{ap}$, $V_{bp}$, and $V_{cp}$) 125-127.

In each of the three PWM cycles illustrated in FIG. 4A, two additional active voltage switching vectors (Sia, Sib and Sic) (hereinafter called test vectors) illustrated in FIG. 5A are inserted into each PWM cycle. For example, as illustrated in FIG. 5A, in the first PWM cycle for phase A active voltage switching vector (V1) (100) 301 and active voltage switching vector (V4) 304 are the test vectors that are inserted in the first PWM cycle for phase A. In the second PWM cycle for phase B active voltage switching vector (V3) 303 and active voltage switching vector (V6) 306 are the test vectors that are inserted in the second PWM cycle for phase B. In the third PWM cycle for phase C active voltage switching vector (V5) 305 and active voltage switching vector (V2) 302 are the test vectors that are inserted in the third PWM cycle for phase C. With respect to each of these PWM cycles, it should be noted that the two injection test vectors are: (1) inserted in the center of the zero voltage switching vector (V7) 307 of the PWM cycle, (2) equal and opposite over any period of time so that the net average voltage applied to the machine due to the injection test vectors is zero (e.g., V1 and V4 in FIG. 5B for motor phase A), and (3) align with the positive and negative phase axes being sampled for that PWM cycle. Three consecutive PWM cycles are needed to test each of the three motor phases successively. To explain further, when test vectors (V1, V4) are injected, for example, it generates zero sequence voltage ($V_{A\_sn}$) for motor phase A. Similarly, in the next PWM cycle/period, when test vectors (V3, V6) this generates the zero sequence voltage ($V_{B\_sn}$) for motor phase B. Likewise, in the next PWM cycle/period, when test vectors (V5, V2) are injected, this generates zero sequence voltage ($V_{C\_sn}$) for motor phase C. This process is continues in the subsequent PWM cycles. The zero sequence voltage is sampled by zero sequence voltage signal ($V_{sn}$) 226 to be used in calculating rotor position signal.

Each of the arrows labeled $V_{A\_sn}$, $V_{B\_sn}$, and $V_{C\_sn}$ in FIG. 5B indicate one possible sampling time (or sample point) when the zero sequence voltage signal signals ($V_{A\_sn}$, $V_{B\_sn}$, and $V_{C\_sn}$) 231-233 are sequentially sampled (measured) by sampling module 228. In each PWM cycle, sampling module 228 can perform the zero sequence voltage measurement via the zero sequence voltage signal ($V_{sn}$) 226 towards the end of either one of the test vectors. The results for measurement during the two complementary test vectors will be equal in magnitude and opposite in sign. In the particular implementation illustrated in FIG. 5B, sampling module 228 performs the zero sequence voltage measurement via the zero sequence voltage signal ($V_{sn}$) 226 towards the end of the first test vector, but the measurement could be performed toward the end of the second test vector as noted above.

The conventional sensorless position estimation technique is typically used at low motor speeds (e.g., 10% of the rated motor speed), where the zero voltage switching vector (V7) 307 represents the majority of the PWM cycle/period. The test vectors should be as short in duration as possible to minimize the current disturbance, but must be sufficiently long (e.g., 10 micro seconds) in duration to allow for the measured voltage to stabilize and for any switching noise to decay. In general, the test vectors will be a small portion (e.g., 10%) of the overall PWM period, so it is easy to fit the test vectors within the zero voltage switching vector (V7) 307 at low modulation indexes, where all three signals are "on" during the period of the zero voltage switching vector (V7) 307.

Significant Problem with the Waveforms of the Switching Vector Signals (Sa*, Sb* and Sc*) Used in a Conventional Sensorless Position Estimation Technique While the conventional sensorless rotor angular position estimation techniques described above can provide a high fidelity estimate of the rotor position, there are some drawbacks. One such drawback relates to the increase in switching losses incurred in the semiconductor devices due to the introduction of test vectors injected within each PWM cycle or period. In general, prior conventional sensorless rotor angular position estimation techniques double the switching losses compared to traditional SVPWM.

To explain further, each time the waveforms illustrated in FIGS. 4A-5B transition from logical zero (0) to logical one (1) (and vice-versa) this causes the both of the switches in a particular phase (i.e., inverter sub-module) to switch on or off.

Insertion of the test vectors into the center of the zero voltage switching vector (V7) 307 in each PWM cycle causes additional transitions in each PWM cycle which means that the switches in a particular phase (i.e., inverter sub-module) are required to turn on or off during each transition. Because the number of transitions is doubled, this results in twice (2×) the switching loss. For example, the traditional SVPWM waveforms illustrated in FIGS. 4A and 4B have six (6) transitions per PWM cycle (or period), which means that there are eighteen (18) transitions in three PWM cycles (or periods). As illustrated in FIGS. 5A and 5B, the addition of the test vectors doubles the number of transitions to thirty-six (36) over three PWM cycles, which means that the number of times the switches turn on and off is doubled. Additional switching losses result in increased semiconductor junction temperatures and reduced system efficiency. Added losses typically increase the cost and reduce the capability of the system.

Having described details and drawbacks of the conventional sensorless rotor angular position estimation techniques, embodiments of the invention will now be described with reference to FIGS. 6 through 8 as applied to a system 100 of FIG. 1.

Figure 6:
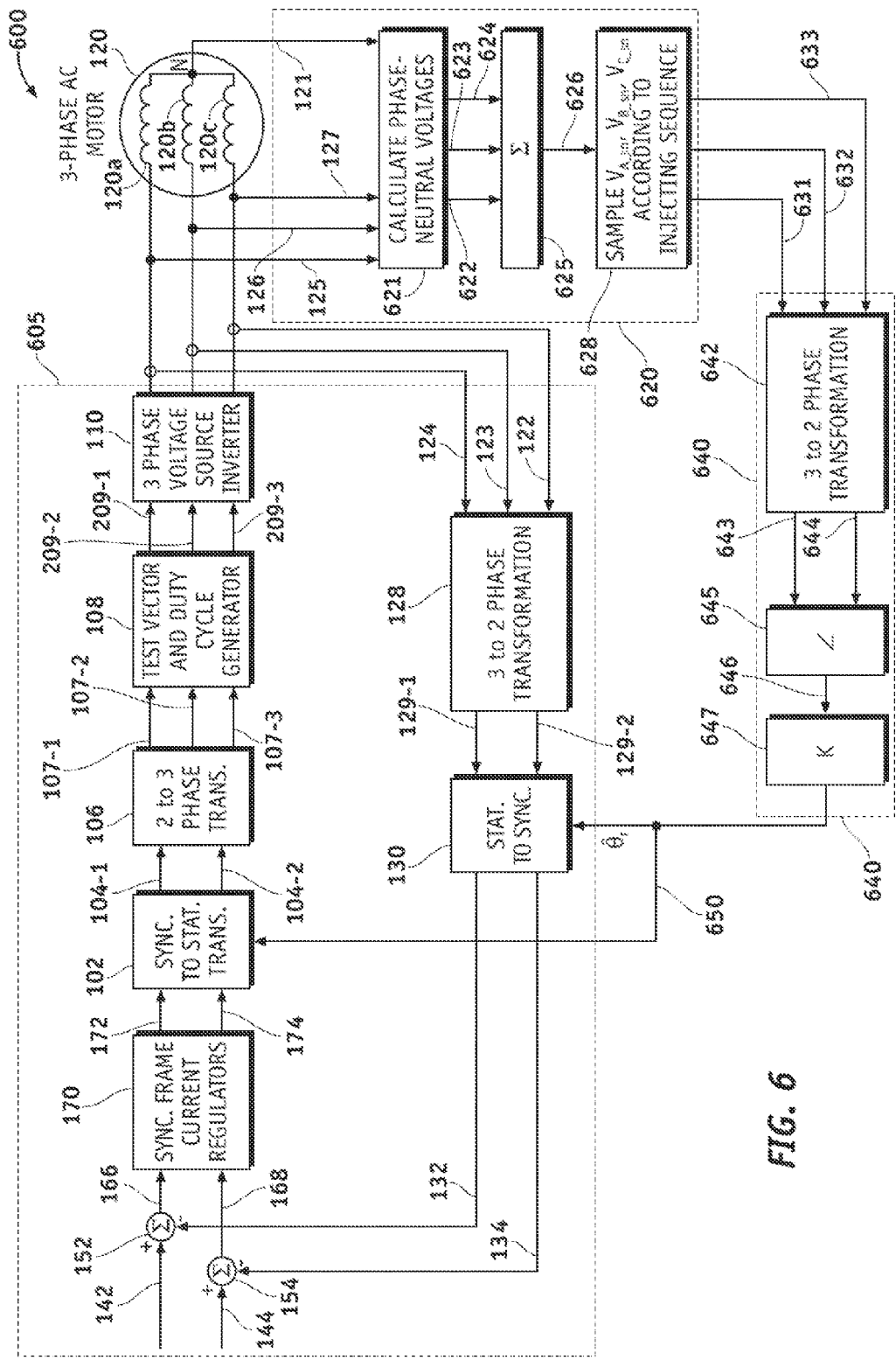
FIG. 6 is a block diagram of a vector controlled motor drive system for high performance vector control with sensorless estimation in accordance with some embodiments of the present invention.

Sensorless Rotor Angular Position Estimation Techniques Implementing Reduced Switching Loss PWM Waveforms FIG. 6 is a block diagram of a vector controlled motor drive system 600 for high performance vector control with sensorless estimation of a rotor's angular position in accordance with some embodiments of the present invention. The vector controlled motor drive system 600 can be used to control torque in a hybrid/electric vehicle (HEV). In this embodiment, the system 600 can be used to control a three-phase AC machine 120 via a three-phase pulse width modulated (PWM) inverter module 110 coupled or connected to the three-phase AC machine 120 so that the three-phase AC machine 120 can efficiently use a DC input voltage (Vdc) available from the three-phase PWM inverter module 110 by adjusting current commands that control the three-phase AC machine 120.

In the following description of one particular non-limiting implementation, the three-phase AC machine 120 is described as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of AC machine. As in FIG. 1, the three-phase AC motor 120 is coupled to the three-phase PWM inverter module 110 via three inverter poles and generates mechanical power (Torque X Speed) based on three-phase sinusoidal voltage signals received from the PWM inverter module 110. As will be described below, the angular position of a rotor of the first three-phase AC motor 120 or "shaft position" is estimated without using a position sensor (not illustrated). Many of the components and signals illustrated in FIG. 6 are the same or similar to those described above with respect to FIG. 1, and for sake of brevity the description of those modules and signals will not be described again. In some instances the names of modules are more specific, but the basic functionality is the same.

The vector control motor drive system 600 includes a vector control module 605, a motor 120, a voltage generator module 620, and an output module 640.

The vector control module 605 receives a torque command (T*e) and generates three-phase voltage commands (Vap ... Vcp). Components or modules which may be used to implement the stator current converter 600 can include a torque-to-current mapping module (not illustrated in FIG. 6, but identical to the torque-to-current mapping module 140 described above with respect to FIG. 1), summer junctions 152 and 154, a synchronous frame current regulator module 170, a synchronous-to-stationary transformation module 102, a two-to-three phase transformation module 106, a test vector and duty cycle generator module 108, a PWM inverter module 110, three-to-two phase transformation module 128, and a stationary-to-synchronous transformation module 130.

The three-to-two phase transformation module 128 receives the three resultant stator currents (Ias, Ibs, Ics) 122, 123, 124 that are measured phase currents from motor 120 and transforms them into two stator currents (Iα, Iβ) 129. The stationary-to-synchronous transformation module 130 receives the stator currents (Iα, Iβ) 129 and the final estimated rotor angular position (θr_est) 650 and generates (i.e., processes or converts) these stator currents (Iα, Iβ) 129 to generate a feedback d-axis current signal (Ids_e) 132 and a feedback q-axis current signal (Iqs_e) 134), which are supplied to the summing junctions 152 and 154 to generate the current errors (Idserror_e and Iqserror_e), as will be described below. The output of the stationary-to-synchronous transformation module 130 can also be called synchronous reference frame current signals (Iqse, Idse) 132, 134.

Summer junctions 152 and 154, which are coupled to the synchronous frame current regulator module 170, receive the feedback d-axis current signal (Ids_e) 132 and the feedback q-axis current signal (Iqs_e) 134 output by the stationary-to-synchronous transformation module 130, and the d-axis current command signal (Ids_e*) 142 and the feedback d-axis current signal (Ids_e) 132 from a torque-to-current mapping module (not illustrated in FIG. 6). The summing junction 152 subtracts the feedback d-axis current signal (Ids_e) 132 from the d-axis current command signal (Ids_e*) 142 to generate a d-axis current error signal (Idserror_e) 166, and the summing junction 154 subtracts the feedback q-axis current signal (Iqs_e) 134 from the q-axis current command signal (Iqs_e*) 144 to generate a q-axis current error signal (Iqserror_e) 168.

The synchronous frame current regulator module 170 receives the d-axis current error signal (Idserror_e) 166 and the q-axis current error signal (Iqserror_e) 168 and uses these signals to generate a d-axis voltage command signal (Vds_e*) 172 and a q-axis voltage command signal (Vqs_e*) 174 that are used to control or regulate current. The process of current to voltage conversion can be implemented as a Proportional-Integral (PI) controller, which is well-known in the art and for sake of brevity will not be described in detail The synchronous-to-stationary transformation module 102 receives the d-axis voltage command signal (Vds_e*) 172 and the q-axis voltage command signal (Vqs_e*) 174 from the synchronous frame current regulator module 170 and the final estimated rotor position angle (θr_est), and uses these signals to generate a α-axis voltage command signal (Vα*) 104-1 and a β-axis voltage command signal (Vβ*) 104-2.

The two-to-three phase transformation module 106 receives the α-axis voltage command signal (Vα*) 104-1, and the β-axis voltage command signal (Vβ*) 104-2, and based on these signals, generates a three-phase sinusoidal voltage command (Va*) 107-1, a three-phase sinusoidal voltage command (Vb*) 107-2, and a three-phase sinusoidal voltage command (Vc*) 107-3.

The vector controlled motor drive system 600 differs from that illustrated in FIG. 1 in that it includes a test vector and duty cycle generator module 108. The test vector and duty cycle generator module 108 receives a set of three-phase sinusoidal voltage commands (Va* ... Vc*) and generates a set of PWM waveforms called modified switching vector signals (Da*) (Da* ... Dc*) 209-1 ... 209-3, such as those illustrated in FIG. 7B, 8B or 9B, which will be described in detail below with reference to FIGS. 7A-9B. The modified switching vector signals (Da*) (Da* ... Dc*) 209-1 ... 209-3 control the switching states of switches in PWM inverter 110 to generate three phase sinusoidal voltage commands. Each set of PWM waveforms includes modified switching vector signals (Da* ... Dc*) 209-1 ... 209-3 have a reduced number of transitions over three consecutive PWM cycles.

In particular, each of the modified switching vector signals (Da* ... Dc*) 209-1 ... 209-3 changes between a high value and a low value during the three consecutive PWM cycles, and the number of transitions between the low value and the high value over the three consecutive PWM cycles is reduced in comparison to FIG. 5B. In general, the number of transitions between the low value and the high value can be greater than six and less than twelve. For instance, in the particular examples illustrated in FIGS. 7B and 8B the number of transitions between the low value and the high value by each of the modified switching vector signals (Da*) (Da* ... Dc*) 209-1 ... 209-3 over the three consecutive PWM cycles is eight. Because the number of transitions is reduced, the number of times the switches in the inverter module switch during each PWM cycle are correspondingly reduced.

As will be described below, the sequence or pattern of the test vectors that are inserted within each PWM cycle is altered to reduce the number of transitions in each PWM cycle such that the number of times switches (e.g., IGBT devices) are turned ON/OFF is reduced. In FIG. 5B the test vectors are introduced into the center of the zero voltage switching vector (V7) 307 in each PWM cycle. In accordance with the disclosed embodiments, the active voltage switching vectors are no longer split on both sides of the zero voltage switching vector (V7) 307 as is the case in FIG. 5B. Instead, the active voltage switching vectors are located on either the left hand or right hand side of the zero voltage switching vector (V7) 307. In addition, the test vectors are no longer located in the center of the zero voltage switching vector (V7) 307, but are placed on the opposite side of the zero voltage switching vector (V7) 307 from the two active voltage switching vectors. Appropriate sequencing of the active and test vectors can assure a minimum number of switch transitions. As will be described in greater detail below, embodiments of the present invention can significantly reduce the switching losses incurred by the introduction or insertion of the test vectors into each PWM cycle, while maintaining the full functionality of the conventional sensorless rotor angular position estimation technique.

The three-phase PWM inverter module 110 is coupled to the test vector and duty cycle generator module 108. The three-phase PWM inverter module 110 receives the DC input voltage (Vdc) and modified switching vector signals (Da*) (Da* ... Dc*) 209-1 ... 209-3, and uses them to generate alternating current (AC) waveforms called three-phase voltage signals (Vap ... Vcp) 125-127 at inverter poles that drive the three-phase AC machine/motor 120 at varying speeds.

The three-phase permanent magnet synchronous motor 120 receives the three-phase voltage signals (Vap ... Vcp) 125-127 generated by the PWM inverter 110 and generates a motor neutral voltage output (Vn) 121 and the commanded torque Te*. In this one particular implementation, the motor 120 comprises a three-phase permanent-magnet synchronous motor (PMSM) 120. Although not illustrated in FIG. 6, the system 600 may also include a gear coupled to and driven by the three-phase AC motor 120 shaft and the three-phase AC machine 120 shaft.

The resultant stator currents (Ias, Ibs and Ics) 122-124 are sensed, sampled and provided to the three-to-two phase transformation module 128, which transforms the three resultant stator currents (Ias, Ibs and Ics) 122-124 into two stator currents (I$\alpha$, I$\beta$) 129.

The stationary-to-synchronous transformation module 130 receives the stator currents (I$\alpha$, I$\beta$) 129 and transforms them into the feedback d-axis current signal (Ids_e) 132 and the feedback q-axis current signal (Iqs_e) 134).

The rotor's angular position can estimated without actually using a sensor. As will be described below, sensorless estimation of the rotor's angular position involves measuring the zero sequence voltage signal ($V_{sn}$) 626 of the motor 120, which will necessarily include some information about the rotor's angular position due to saliency of the motor 120. In some cases, the saliency is an intentional design feature of the motor 120, such as found in synchronous reluctance or interior permanent magnet machines. In other cases, the saliency could be due to a secondary effect, such as rotor bar slotting in the rotor of an induction machine. Further operational details of sensorless operation will now be described with reference to FIGS. 7A-9B.

The voltage generator module 620 receives the three-phase voltage signals (Vap ... Vcp) 125-127 and the motor neutral voltage output (Vn) 121 from the three-phase permanent magnet synchronous motor 120 and generates sequentially sampled three-phase zero-sequence voltages (VA_sn ... VC_sn) 631-633. Components or modules which may be used to implement the voltage generator module 620 include a phase-to-neutral voltage generator module 621, a summing junction 625, and a zero sequence voltage sampling module 628.

The phase-neutral voltage calculator module 621 and the summing junction 625 operate in the same manner as described above with reference to FIG. 1 to generate the zero-sequence voltage signal (Vsn) 626. The zero sequence voltage sampling module 628 receives the zero-sequence voltage (Vsn) 626 and sequentially samples the zero-sequence voltage (Vsn) 626 according to a test vector sequence from the zero-sequence voltage signal (Vsn) 626 to generate three sequentially sampled three-phase zero-sequence voltage signals (VA_sn ... VC_sn) 631-633. The zero sequence voltage sampling module 628 sequentially samples the zero sequence voltage ($V_{sn}$) according to injecting sequence to align the sample with the injected test pulse vector and generates three-phase zero sequence voltage signals (VA_sn ... VC_sn) 631-633 for each of the three, which are then supplied to a three phase-to-two phase conversion module 642 for three phase to two phase conversion, as will be described below. A test pulse triggers the zero sequence voltage sampling module 628 to sample the zero sequence voltage signal ($V_{sn}$) 626 and to generate one of the zero-sequence voltage signals (VA_sn ... VC_sn) 631-633 that corresponds to that particular PWM period that the test vector is from. The three sequentially sampled three-phase zero-sequence voltage signals (VA_sn ... VC_sn) 631-633 are each updated every third PWM period. For example, in FIG. 7B, during the first period, a sample VA_sn 631 is taken at the end of V4. During the next period, another sample for VB_sn 632 is taken at the end of the V6 test vector, and so on. As such, the sample rate of three sequentially sampled three-phase zero-sequence voltage signals (VA_sn ... VC_sn) 631-633 is typically ⅓ the sample rate of the rest of the controls (i.e., the signals only updated every third PWM cycle).

To explain further, the motor 626 is excited with special test voltage pulses, which will be described in detail below with reference to FIGS. 7A-9B. One motor phase A, B, or C 120a-120c is tested during each PWM cycle or period. Each of the three motor phases A, B, C 120a-120c will be tested once in any three successive PWM periods.

In one embodiment, during the test pulse, the zero sequence voltage signal ($V_{sn}$) 626 can be sampled using an analog-to-digital converter, and sampling module can sequentially generate or sample three separate zero sequence voltage signals (VA_sn . . . VC_sn) 631-633. Each of the three sequentially sampled three-phase zero sequence voltage signals (VA_sn . . . VC_sn) 631-633 are updated every third PWM period. In one implementation, a microprocessor, which is programmed with timing sequences of the test pulses and test vectors, can schedule an A-to-D sample to trigger at the appropriate point (toward the end of the test vector). The sampled data is then allocated to the appropriate one of three-phase zero-sequence voltage signals (VA_sn . . . VC_sn) 631-633 depending upon which phase the test vector was being excited.

The output module 640 receives sampled three-phase zero-sequence voltages (VA_sn . . . VC_sn) 631-633, and generates the final estimated rotor angular position (θr_est) 650. Components or modules which may be used to implement the output module 640 include a three phase-to-two phase conversion module 642, an angle calculator module 645 that computes an arctangent angle, and an angle scaling module 647 that scales the arctangent angle output by angle calculator module 645 according to a scaling constant (K).

The three phase-to-two phase conversion module 642 and the angle calculator module 645 operate in the same manner as described above with reference to FIG. 1 to calculate the angle of the vector represented by the two-phase zero-sequence voltages (VAlpha_sn, VBeta_sn) 643, 644. The output 646 of the angle calculator module 645 is the angle of the motor saliency being tracked, and is proportional to angular position (θ^r) of the rotor. The angle scaling module 647 generates the final estimated rotor angular position (θr_est) 650.

First Embodiment

Leading Edge Active Vectors and Trailing Edge Test Vectors

Figure 7A:
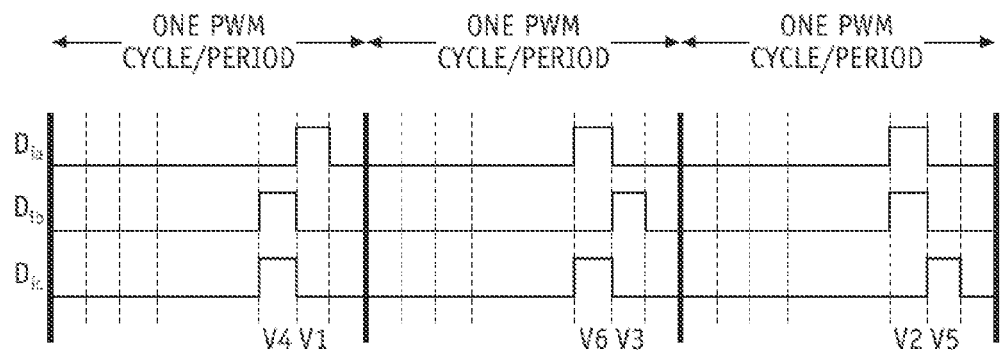
FIG. 7A is a graph showing PWM waveforms (Dia, Dib and Dic) that include complementary test vectors in accordance with a first embodiment of the present invention.
Figure 7B:
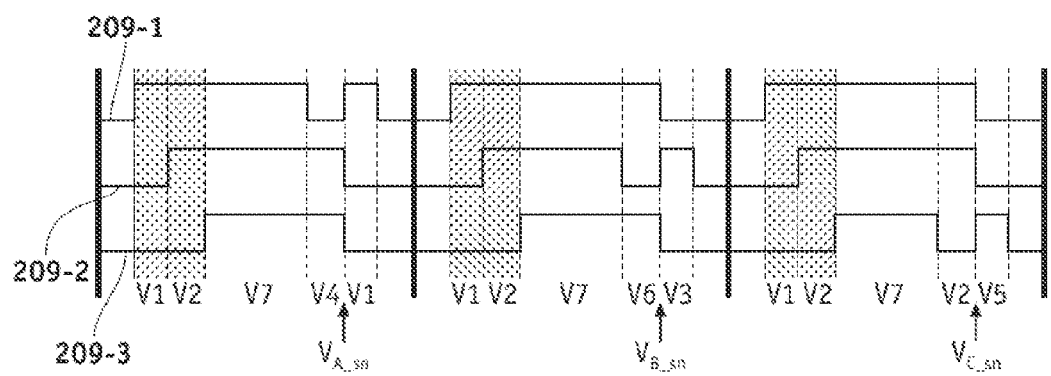
FIG. 7B is a graph showing synthesized PWM waveforms of the modified switching vector signals (Da*, Db* and Dc*) used in a sensorless position estimation technique in accordance with a first embodiment of the present invention.

FIG. 7A is a graph showing PWM waveforms (Dia, Dib and Dic) that include complementary test vectors used in accordance with a first embodiment of the present invention. The test pulses in FIG. 7A define a pair of complementary test vectors (V4/V1; V6/V3; V2/V5) in each PWM cycle/period. FIG. 7B is a graph showing synthesized PWM waveforms of the modified switching vector signals (Da*, Db* and Dc*) 209-1 . . . 209-3 in a sensorless position estimation technique in accordance with a first embodiment of the present invention. The modified switching vector signals (Da*, Db* and Dc*) 209-1 . . . 209-3 are used as gate commands to drive the gates (Ga . . . Gf) of switches 182, 184, 186, 188, 190, 192 in the three-phase voltage source inverter 110. As in FIG. 4B, the PWM waveforms in FIGS. 7A and 7B are those corresponding to sector one (1) in FIG. 3; however, in contrast to FIG. 4B it is noted that three PWM cycles are illustrated (as opposed to one PWM cycle in FIG. 4B). The PWM waveforms for each of the other 5 sectors will be similar but are not illustrated for sake of brevity.

As illustrated in FIG. 7B, the set of PWM waveforms 209 comprise a first modified switching vector signal (Da*) 209-1 for phase A (i.e., that controls switching of switches in inverter sub-module 115), a second modified switching vector signal (Db*) 209-2 for phase B (i.e., that controls switching of switches in inverter sub-module 117), and a third modified switching vector signal (Dc*) 209-3 for phase C (i.e., that controls switching of switches in inverter sub-module 119). Each signal is shown over the three consecutive PWM cycles. The modified switching vector signals (Da* . . . Db*) 209-1 . . . 209-3 each have a value (i.e., amplitude) that changes between a high value (e.g., logical 1) and a low value (e.g., logical 0) during or "over the course of" the three consecutive PWM cycles. In this particular implementation, the number of transitions by the modified switching vector signals (Da* . . . Db*) 209-1 . . . 209-3 between the low value and the high value over the three consecutive PWM cycles is eight (e.g., the number of transitions by the first modified switching vector signal (Da*) 209-1 between the low value and the high value over the three consecutive PWM cycles is eight), but in general the number of transitions can be greater than six transitions (as in FIG. 4A) and less than twelve transitions (as in FIG. 5B). In comparison to the modified switching vector signals (Sa*, Sb* and Sc*) 109-1 . . . 109-3 illustrated in FIG. 5B, the modified switching vector signals (Da*, Db* and Dc*) 209-1 . . . 209-3 that are illustrated in FIG. 7B undergo a total of twenty-four (24) switch transitions over the three consecutive PWM cycles or periods instead of thirty-six (36) transitions. This is a significant reduction of in the number of transitions which greatly reduced switching losses when driving the gates (Ga . . . Gf) of switches 182, 184, 186, 188, 190, 192 in the three-phase voltage source inverter 110.

The various signals will now be described in greater detail. At any particular time during the three consecutive PWM cycles the first value (i.e., amplitude) of the first modified switching vector signal (Da*) 209-1, the second value (i.e., amplitude) of the second modified switching vector signal (Db*) 209-2 and the third value (i.e., amplitude) third modified switching vector signal (Dc*) 209-3 define a particular voltage switching vector of the set of eight voltage switching vectors (V1 . . . V7) 301 . . . 308 that are described above with reference to FIGS. 3A and 3B. For purposes of the following discussion, these voltage switching vectors will be referred to as a first zero voltage switching vector (V0) 308, a second zero voltage switching vector (V7) 307 and six active voltage switching vectors (V1 through V6) 301-306.

In the particular implementation illustrated in FIG. 7B, the first value, the second value and the third value collectively define: the first zero voltage switching vector (V0) 308 at a beginning portion of each of the three consecutive PWM cycles, the second zero voltage switching vector (V7) 307 in a middle portion of each of the three consecutive PWM cycles, and the first zero voltage switching vector (V0) 308 at an end portion of each of the three consecutive PWM cycles. As explained above, the first zero voltage switching vector (V0) 308 is defined when the first value, the second value and the third value each have low values (i.e., logical zero (0)), and the second zero voltage switching vector (V7) 307 is defined when the first value, the second value and the third value each have high values (i.e., logical one (1)), and is defined continuously in each PWM cycle without intervening vectors. In each of the modified switching vector signals (Da*, Db* and Dc*) 209-1 . . . 209-3 that are illustrated in FIG. 7B, the active vectors (located in the shaded areas) are placed on the left hand side or near the "leading edge" of the zero voltage switching vector (V7) 307, and the test vectors are placed on the right hand side or near the "trailing edge" of the zero voltage switching vector (V7) 307, as will now be explained below.

For example, in the first PWM cycle, the synthesized PWM waveforms of the modified switching vector signals (Da* . . .

Dc*) 209-1 ... 209-3 collectively define a sequence of switching vectors that starts off with the zero voltage switching vector (V0) 308, continues with the active voltage switching vector (V1) (100) 301 and the active voltage switching vector (V2) 302 near the leading edge of the zero voltage switching vector (V7) 307, followed by the zero voltage switching vector (V7) 307 in center of the PWM cycle or period. The active voltage switching vector (V1) (100) 301 includes one phase in the high state, and the active voltage switching vector (V2) 302 includes two phases in the high state. The sequence of vectors is the same as the PWM in FIGS. 4A and 4B. However the active vectors are no longer split, so are now twice as long as in FIG. 5B. After the zero voltage switching vector (V7) 307, the first test vector (V4) 304 and the second test vector (V1) (100) 301 are inserted at the trailing edge of the zero voltage switching vector (V7) 307. In particular, the first test vector (V4) 304 with two phases in the high state is inserted followed by the complementary test vector (V1) (100) 301 with one phase in the high state. The sequence ends with the zero voltage switching vector (V0) 308 such that the remainder of the PWM period is filled with the zero voltage switching vector (V0) 308.

In the particular embodiment illustrated in FIG. 7B, each PWM cycle can be split into a first half of the PWM cycle and a second half of the PWM cycle. As illustrated, within the first value, the second value and the third value further collectively define a first active voltage switching vector (V1) 301 in the first half of each PWM cycle, a second active voltage switching vector (V2) 302 in the first half of each PWM cycle and following the first active voltage switching vector (V1) 301, a first test vector (V4) 304 in the second half of each PWM cycle, and a second test vector (V1) 301 in the second half of each PWM cycle and following the first test vector (V4) 304. The first active voltage switching vector (V1) 301 and the second active voltage switching vector (V2) 302 are defined between the first zero voltage switching vector (V0) 308 that is defined at the beginning portion of each of the three consecutive PWM cycles and the second zero voltage switching vector (V7) 307 that is defined in the middle portion of each of the three consecutive PWM cycles without any other intervening vectors defined between the first zero voltage switching vector (V0) 308 that is defined at the beginning portion of each of the three consecutive PWM cycles and the second zero voltage switching vector (V7) 307 that is defined in the middle portion of each of the three consecutive PWM cycles. The second test vector (V1) 301 and the first test vector (V4) 304 are defined between the second zero voltage switching vector (V7) 307 and the first zero voltage switching vector (V0) 308 that is defined at the end portion of each of the three consecutive PWM cycles without any other intervening vectors defined between the second zero voltage switching vector (V7) 307 and the first zero voltage switching vector (V0) 308 that is defined at the end portion of each of the three consecutive PWM cycles.

The second test vector (V1) 301 and the first test vector (V4) 304 are complementary. Here, the term "complementary" means that test vectors are always equal in duration and opposite in magnitude such that in aggregate a pair of complementary test vectors have no effect on the voltages that are generated by the inverter module 110 for the machine 120 that is being driven. By contrast, "active" voltage switching vectors are not complementary and are used to by the inverter module 110 to generate voltages 125-127 that drive the machine 120 it is coupled to. On the other hand, "zero voltage" switching vectors are V7 and V0. In this regard, the active vectors are of a very narrow duration in comparison to "zero voltage" switching vectors for the low speed condition.

At low speed operation (e.g., <10% of the rated speed), the first zero voltage switching vector (V0) 308 and the second zero voltage switching vector (V7) 307 each have a duration greater than that of any of the active voltage switching vectors (V1 through V6) 301-306 and any test vectors.

In this particular implementation, the illustrated in FIGS. 7A and 7B, the test vectors are inserted near the trailing edge of the zero voltage switching vector (V7) 307; however, the test vectors can be inserted anywhere within the PWM cycle. However, it may be beneficial in some cases to insert the test vectors at either the left or right hand side of the PWM period. In this case the first zero voltage switching vector (V0) 308 is no longer split into two. For example, in inserting the test vectors at the trailing edge of the zero voltage switching vector (V7) 307 (i.e., to the right hand side of the PWM cycle) and placing the entire zero voltage switching vector (V0) 308 on the left hand edge of the PWM cycle has several advantages. The ripple current induced in the motor phase should ideally have a zero mean value (i.e., the average current is sampled). For instance, when test vector (V1) is injected, this increases current in phase for the duration of the time its injected, and therefore test vector (V4) is injected for the same duration as test vector (V1) to bring down the current so that the resultant current induced by test vector (V1) and test vector (V4) is zero. At low speeds, the active vectors are very short, and the zero vector is equally split between zero voltage switching vector (V0) 308 and zero voltage switching vector (V7) 307. Placing the active vectors toward the center of the PWM cycle will tend to minimize and DC bias added to the phase current due to the ripple. Also, this will guarantee that the zero sequence voltage signal ($V_{sn}$) 626 sample occurs at the same location in each PWM cycle.

In FIG. 7B, the zero sequence voltage signal ($V_{sn}$) 626 is sampled by the sampling module 628 at sample points marked by arrows ($V_{A\_sn}$, $V_{B\_sn}$, and $V_{C\_sn}$) 631-633. In this particular implementation, the sample point is shown during the first test vector (V4) 304 following the zero voltage switching vector (V7) 307. This may offer some advantages as far as noise sensitivity is concerned. However, the zero sequence voltage signal ($V_{sn}$) 626 can be sampled by the sampling module 628 during either test vector 304, 301 (i.e., the zero sequence voltage could have been sampled during the second test vector 301 as well), as long as the sign is accounted for. Also, the measurement vector ($V_{A\_sn}$, $V_{B\_sn}$, and $V_{C\_sn}$) 631-633 used to sample the zero sequence voltage signal ($V_{sn}$) 626 can be located anywhere in the PWM cycle or period (i.e., it does not rely on the previous inverter state). Sampling at the same point within each PWM period is not essential, as the rotor movement within one PWM cycle is insignificant since the rotor speed is low relative to the PWM frequency.

Second Embodiment

Trailing Edge Active Vectors and Leading Edge Test Vectors

Figure 8A:
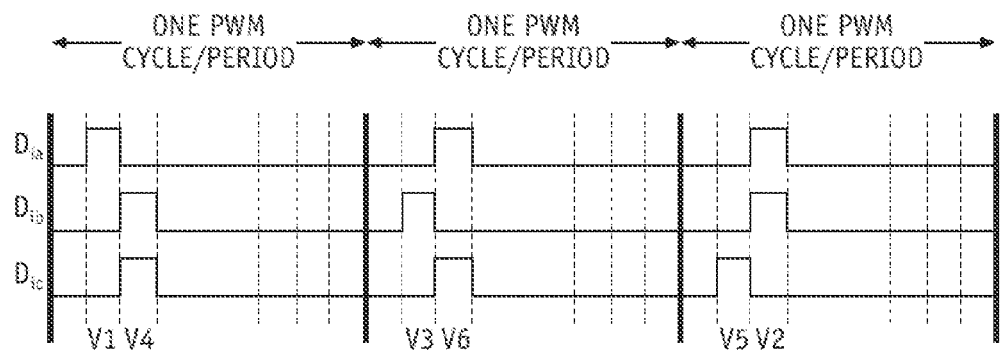
FIG. 8A is a graph showing PWM waveforms (Dia, Dib and Dic) that include complementary test vectors used in accordance with a second embodiment of the present invention.
Figure 8B:
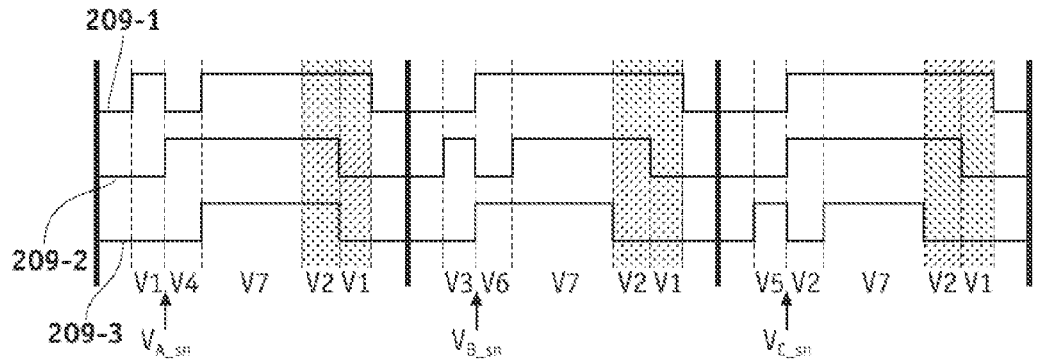
FIG. 8B is a graph showing synthesized PWM waveforms of the modified switching vector signals (Da*, Db* and Dc*) used in a sensorless position estimation technique in accordance with a second embodiment of the present invention.

FIG. 8A is a graph showing PWM waveforms (Dia, Dib and Dic) that include complementary test vectors in accordance with a second embodiment of the present invention. The test pulses in FIG. 8A define a pair of complementary test vectors (V1/V4; V3/V6; V5/V2) in each PWM cycle/period. FIG. 8B is a graph showing synthesized PWM waveforms of the modified switching vector signals (Da*, Db* and Dc*) 209-1 ... 209-3 in a sensorless position estimation technique in accordance with a second embodiment of the present invention. The modified switching vector signals (Da*, Db* and Dc*) 209-1 ... 209-3 are used as gate commands to drive the gates (Ga ... Gf) of switches 182, 184, 186, 188, 190, 192 in the three-phase voltage source inverter 110. As in FIG. 4B, the PWM waveforms in FIGS. 8A and 8B are those corresponding to sector one (1) in FIG. 3; however, in contrast to FIG. 4B it is noted that three PWM cycles are illustrated (as opposed to one PWM cycle in FIG. 4B). The PWM waveforms for each of the other 5 sectors will be similar but are not illustrated for sake of brevity.

In the embodiment illustrated in FIG. 8B, the first value, the second value and the third value collectively define a first test vector (V1) 301 in the first half of each PWM cycle and followed by a second test vector (V4) 304 that is also in the first half of each PWM cycle, a first active voltage switching vector (V1) 301 in the second half of each PWM cycle, and a second active voltage switching vector (V2) 302 in the second half of each PWM cycle followed by the first active voltage switching vector (V1) 301. In the synthesized PWM waveforms of the modified switching vector signals (Da*, Db* and Dc*) 209-1 ... 209-3 that are illustrated in FIG. 8B, the active vectors (located in the shaded areas) are placed on the right hand side or near the "trailing edge" of the zero voltage switching vector (V7) 307, and the test vectors are placed on the left hand side or near "leading edge" of the zero voltage switching vector (V7) 307.

The first test vector (V1) 301 and the second test vector (V4) 304 are defined between the first zero voltage switching vector (V0) 308 (that is defined at the beginning portion of each of the three consecutive PWM cycles) and the second zero voltage switching vector (V7) 307 (that is defined in the middle portion of each of the three consecutive PWM cycles) without any other intervening vectors defined between the first zero voltage switching vector (V0) 308 that is defined at the beginning portion of each of the three consecutive PWM cycles and the second zero voltage switching vector (V7) 307 that is defined in the middle portion of each of the three consecutive PWM cycles. The first active voltage switching vector (V1) 301 and the second active voltage switching vector (V2) 302 are defined between the second zero voltage switching vector (V7) 307 and the first zero voltage switching vector (V0) 308 that is defined at the end portion of each of the three consecutive PWM cycles.

For example, in the first PWM cycle, the synthesized PWM waveforms of the modified switching vector signals (Da* ... Dc*) 209-1 ... 209-3 collectively define a combination of switching vectors that starts off with the zero voltage switching vector (V0) 308, and continues with the first test vector (V1) (100) 301 and the second test vector (V4) (011) 304 which are inserted at or near the leading edge of the zero voltage switching vector (V7) 307. In particular, the test vector (V1) (100) 301 with one phase in the high state is inserted followed by the complementary second test vector (V4) 304 with two phases in the high state. Following the test vectors is the zero voltage switching vector (V7) 307 in center of the PWM cycle or period, which is followed by the active voltage switching vector (V2) 302 (that includes two phases in the high state) at or near the trailing edge of the zero voltage switching vector (V7) 307 and the active voltage switching vector (V1) (100) 301 (that includes one phase in the high state). The sequence ends with the zero voltage switching vector (V0) 308 such that the remainder of the PWM period is filled with the zero voltage switching vector (V0) 308.

As in FIG. 7B, the modified switching vector signals (Da*, Db* and Dc*) 209-1 ... 209-3 that are illustrated in FIG. 8B undergo a total of twenty-four (24) switch transitions over the three consecutive PWM cycles or periods instead of thirty-six (36) transitions as is the case with the modified switching vector signals (Sa*, Sb* and Sc*) 109-1 ... 109-3 illustrated in FIG. 5B. This significant reduction of in the number of transitions greatly reduces switching losses when driving the gates (Ga ... Gf) of switches 182, 184, 186, 188, 190, 192 in the three-phase voltage source inverter 110.

In FIG. 8B, the zero sequence voltage signal ($V_{sn}$) 626 is sampled by the sampling module 628 at sample points marked by arrows ($V_{A\_sn}$, $V_{B\_sn}$, and $V_{C\_sn}$) 631-633. In this particular implementation, the sample point is shown during the first test vector (V1) 301 at the leading edge of the zero voltage switching vector (V7) 307. This may offer some advantages as far as noise sensitivity is concerned. However, as noted above, the zero sequence voltage signal ($V_{sn}$) 626 can be sampled by the sampling module 628 during either test vector 301, 304 (i.e., the zero sequence voltage can be sampled during the second test vector 304 as well), as long as the sign is accounted for. As also noted above, the measurement vector ($V_{A\_sn}$, $V_{B\_sn}$, and $V_{C\_sn}$) 631-633 used to sample the zero sequence voltage signal ($V_{sn}$) 626 can be located anywhere in the PWM cycle or period (i.e., it does not rely on the previous inverter state). Sampling at the same point within each PWM period is not essential, as the rotor movement within one PWM cycle is insignificant since the rotor speed is low relative to the PWM frequency.

The PWM schemes of the first embodiment (FIGS. 7A and 7B) and the second embodiment (FIGS. 8A and 8B) can significantly reduce (by 66%) the number of switching transitions and switching losses in comparison to the conventional sensorless position estimation technique, which utilizes the PWM waveforms illustrated in FIG. 5B. An additional reduction in the number of switching transitions (and overall switching losses) is possible by using one of the active vectors in one of the three PWM cycles as one of the test vectors, as will now be described with reference to FIGS. 9A and 9B.

Third Embodiment

Using an Active Vector in One of the PWM Cycles as One of the Test Vectors

Figure 9A:
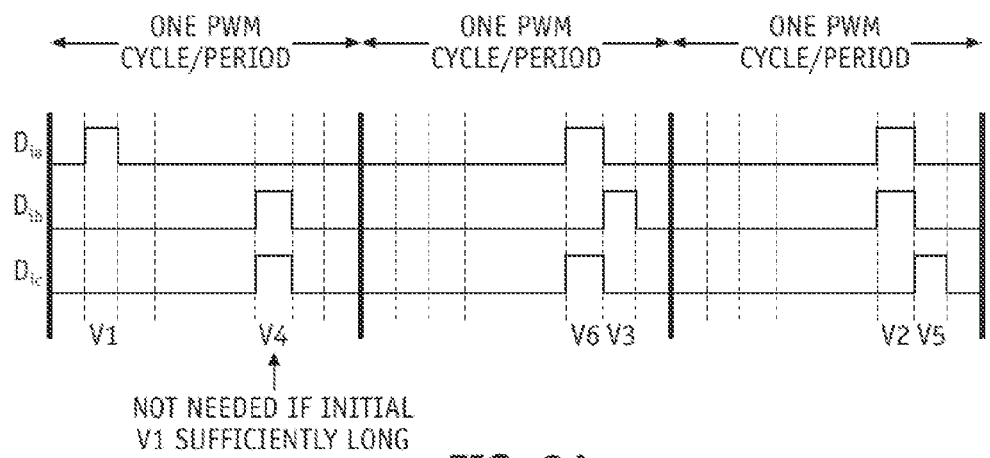
FIG. 9A is a graph showing PWM waveforms (Dia, Dib and Dic) that include complementary test vectors used in accordance with a third embodiment of the present invention.
Figure 9B:
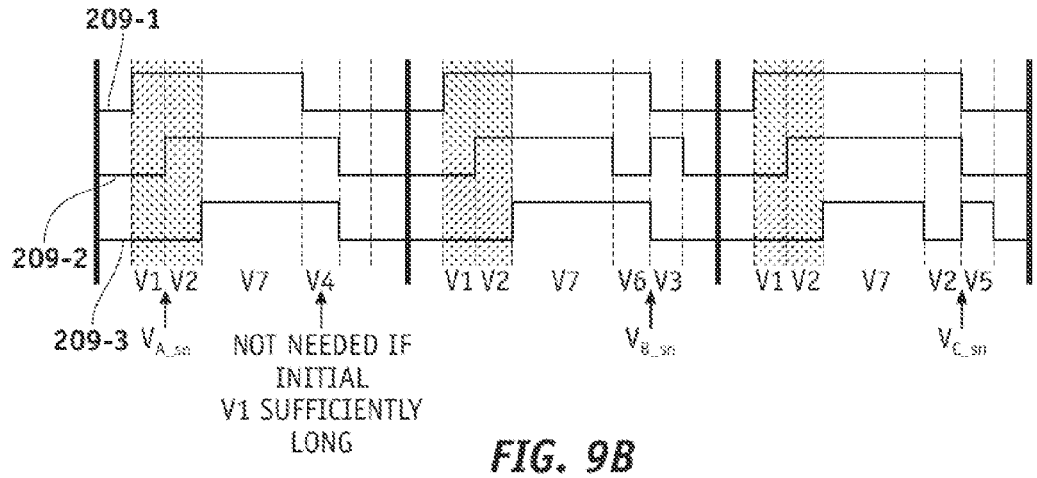
FIG. 9B is a graph showing synthesized PWM waveforms of the modified switching vector signals (Da*, Db* and Dc*) used in a sensorless position estimation technique in accordance with a third embodiment of the present invention.

FIG. 9A is a graph showing PWM waveforms (Dia, Dib and Dic) that include complementary test vectors used in accordance with a third embodiment of the present invention. The test pulses in FIG. 9A define a pair of complementary test vectors (V1/V4; V6/V3; V2/V5) in each PWM cycle/period. FIG. 9B is a graph showing synthesized PWM waveforms of the modified switching vector signals (Da*, Db* and Dc*) 209-1 ... 209-3 in a sensorless position estimation technique in accordance with a third embodiment of the present invention. The modified switching vector signals (Da*, Db* and Dc*) 209-1 ... 209-3 are used as gate commands to drive the gates (Ga ... Gf) of switches 182, 184, 186, 188, 190, 192 in the three-phase voltage source inverter 110. As in FIG. 4B, the PWM waveforms in FIGS. 9A and 9B are those corresponding to sector one (1) in FIG. 3; however, in contrast to FIG. 4B it is noted that three PWM cycles are illustrated (as opposed to one PWM cycle in FIG. 4B). The PWM waveforms for each of the other 5 sectors will be similar but are not illustrated for sake of brevity.

As in the first embodiment, in the synthesized PWM waveforms of the modified switching vector signals (Da*, Db* and Dc*) 209-1 ... 209-3 that are illustrated in FIG. 9B, the active vectors (located in the shaded areas) are placed on the left hand side or near the "leading edge" of the zero voltage switching vector (V7) 307. In the particular implementation illustrated in FIG. 9B, the first value, the second value and the third value collectively define: a first active voltage switching vector (V1) 301 in the first half of each PWM cycle, and a second active voltage switching vector (V2) 302 in the first half of each PWM cycle and following the first active voltage switching vector (V1) 301.

For example, in the first PWM cycle for phase A, starts off with the zero voltage switching vector (V0) 308, continues with the active voltage switching vector (V1) (100) 301 and the active voltage switching vector (V2) 302 on or near the leading edge of the zero voltage switching vector (V7) 307, followed by the zero voltage switching vector (V7) 307 in center of the PWM cycle or period. The active voltage switching vector (V1) (100) 301 that includes one phase in the high state, and the active voltage switching vector (V2) 302 includes two phases in the high state. In this particular embodiment, the first active voltage switching vector (V1) 301 and the second active voltage switching vector (V2) 302 are defined between the first zero voltage switching vector (V0) 308 (that is defined at the beginning portion of each of the three consecutive PWM cycles) and the second zero voltage switching vector (V7) 307 (that is defined in the middle portion of each of the three consecutive PWM cycles) without any other intervening vectors defined between the first zero voltage switching vector (V0) 308 (that is defined at the beginning portion of each of the three consecutive PWM cycles) and the second zero voltage switching vector (V7) 307 (that is defined in the middle portion of each of the three consecutive PWM cycles).

However, in this embodiment, the complementary test vector in the first PWM cycle can be eliminated. In this cycle, the active voltage switching vector (V1) (100) 301 can be used as the test vector as well to eliminate an additional two switch transitions. In the case that the active voltage switching vector (V1) (100) 301 is sufficiently long to provide a noise free zero sequence voltage sample, the existing active voltage switching vector (V1) (100) 301 can be used without modification such that no complementary test vector is needed. In the case that the active vector is not sufficiently long for zero sequence voltage measurement purposes, the active vector can be extended as required. In this situation, the cancellation vector can be appended to the opposite side of the zero voltage switching vector (V7) 307 without incurring any additional switching losses.

After the zero voltage switching vector (V7) 307, the first test vector (V4) 304 is inserted at the trailing edge of the zero voltage switching vector (V7) 307. In this embodiment, only the first test vector (V4) 304 with two phases in the high state is inserted without inserting the complementary test vector (V1) (100) 301.

The first test vector (V4) 304 is defined between the second zero voltage switching vector (V7) 307 (that is defined in the middle portion of each of the three consecutive PWM cycles) and the first zero voltage switching vector (V0) 308 (that is defined at the end portion of each of the three consecutive PWM cycles). The first value, the second value and the third value collectively define the first test vector (V4) 304 between the second zero voltage switching vector (V7) 307 (that is defined in the middle portion of each of the three consecutive PWM cycles) and the first zero voltage switching vector (V0) 308 (that is defined at the end portion of each of the three consecutive PWM cycles) without any other intervening vectors defined between the second zero voltage switching vector (V7) 307 and the first zero voltage switching vector (V0) 308 that is defined at the end portion of each of the three consecutive PWM cycles.

In comparison to the modified switching vector signals (Sa*, Sb* and Sc*) 109-1 ... 109-3 illustrated in FIG. 5B, the modified switching vector signals (Da*, Db* and Dc*) 209-1 ... 209-3 that are illustrated in FIG. 9B undergo a total of twenty-two (22) switch transitions over the three consecutive PWM cycles or periods instead of thirty-six (36) transitions further reducing the number of transitions and switching losses when driving the gates (Ga ... Gf) of switches 182, 184, 186, 188, 190, 192 in the three-phase voltage source inverter 110.

In FIG. 9B, the zero sequence voltage signal ($V_{sn}$) 226 is sampled by the sampling module 628 at sample points marked by arrows ($V_{A\_sn}, V_{B\_sn}$, and $V_{C\_sn}$) 631-633. In this particular implementation, the sample point is shown during the active voltage switching vector (V1) (100) 301 on the leading edge of the zero voltage switching vector (V7) 307.

Although FIGS. 9A and 9B shows the technique of using one of the active vectors as an test vector as applied to the first embodiment (leading active vectors as illustrated in FIGS. 7A and 7B), it is noted that similar PWM waveforms can be obtained for the second embodiment (trailing active vectors as illustrated in FIGS. 8A and 8B). In each case, two switching transitions can be eliminated during the three PWM cycles. With this improvement, the additional switching losses can be reduced by 78% in comparison to the conventional sensorless position estimation technique, which utilizes the PWM waveforms illustrated in FIG. 5B.

Summary

Table 1 summarizes the number of switch transitions, normalized to the standard space vector PWM without test vectors that is illustrated in FIG. 4A. The conventional sensorless position estimation technique, which utilizes the PWM waveforms illustrated in FIG. 5B, has double the number of switching transitions compared to standard space vector PWM with no test vectors. This can lead to significant switching losses, and limit the phase current capability when employing the conventional PWM waveforms (FIG. 5B) for sensorless position estimation.

TABLE 1

| | Standard SVPWM waveform (FIG. 4A) | Standard PWM waveform with test pulses (FIG. 5B) | First Embod. (FIG. 7B) | Second Embod. (FIG. 8B) | Third Embod. (FIG. 9B) |
|---|---|---|---|---|---|
| Normalized Number of Trans. per 3 PWM Cycles | 1.0 | 2.0 | 1.33 | 1.33 | 1.22 |

By contrast, the first embodiment (FIGS. 7A and 7B) and the second embodiment (FIGS. 8A and 8B) can significantly reduce the number of switching transitions in comparison to the conventional sensorless position estimation technique, which utilizes the PWM waveforms illustrated in FIG. 5B. The number of switching transitions can be reduced even further by using the active vector as one of the test vectors as in the third embodiment (FIGS. 9A and 9B). As such, the disclosed embodiments can greatly reduce switching losses.

Those of skill would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vector controlled motor drive system, comprising:
a test vector and duty cycle generator module designed to receive a set of three-phase voltage command signals and designed to generate a set of pulse width modulated (PWM) waveforms, wherein the set of PWM waveforms comprise:
a first modified switching vector signal for a first motor phase that comprises at least two test pulses over three consecutive PWM cycles, wherein the first modified switching vector signal has a first amplitude value that changes between a high amplitude value and a low amplitude value during the three consecutive PWM cycles, and wherein a number of transitions by the first modified switching vector signal between the low amplitude value and the high amplitude value over the three consecutive PWM cycles is greater than six and less than twelve.

2. A vector controlled motor drive system according to claim 1, wherein the set of PWM waveforms further comprise:
a second modified switching vector signal for a second motor phase that comprises at least two test pulses over the three consecutive PWM cycles, wherein the second modified switching vector signal has a second amplitude value that changes between the high amplitude value and the low amplitude value during the three consecutive PWM cycles, and wherein a number of transitions by the second modified switching vector signal between the low amplitude value and the high amplitude value over the three consecutive PWM cycles is greater than six and less than twelve; and
a third modified switching vector signal for a third motor phase that comprises at least two test pulses over the three consecutive PWM cycles, wherein the third modified switching vector signal has a third amplitude value that changes between the high amplitude value and the low amplitude value during the three consecutive PWM cycles, and wherein a number of transitions by the third modified switching vector signal between the low amplitude value and the high amplitude value over the three consecutive PWM cycles is greater than six and less than twelve.

3. A vector controlled motor drive system according to claim 2, wherein at any particular time during the three consecutive PWM cycles the first amplitude value, the second amplitude value and the third amplitude value define a particular voltage switching vector of a set of eight voltage switching vectors comprising a first zero voltage switching vector, a second zero voltage switching vector and six active voltage switching vectors, and wherein the first amplitude value, the second amplitude value and the third amplitude value collectively define:
the first zero voltage switching vector at a beginning portion of each of the three consecutive PWM cycles, wherein the first zero voltage switching vector is defined when the first amplitude value, the second amplitude value and the third amplitude value each have low amplitude values;
the second zero voltage switching vector in a middle portion of each of the three consecutive PWM cycles, wherein the second zero voltage switching vector is defined when the first amplitude value, the second amplitude value and the third amplitude value each have high amplitude values, and wherein the second zero voltage switching vector is defined continuously in each PWM cycle without intervening vectors; and
the first zero voltage switching vector at an end portion of each of the three consecutive PWM cycles.

4. A vector controlled motor drive system according to claim 3, wherein the first zero voltage switching vector and the second zero voltage switching vector each have a duration greater than that of any of the test vectors.

5. A vector controlled motor drive system according to claim 3, wherein each PWM cycle includes a first half of the PWM cycle and a second half of the PWM cycle, and wherein within the first amplitude value, the second amplitude value and the third amplitude value further collectively define:
a first active voltage switching vector in the first half of each PWM cycle;
a second active voltage switching vector in the first half of each PWM cycle and following the first active voltage switching vector;
a first test vector in the second half of each PWM cycle; and
a second test vector in the second half of each PWM cycle and following the first test vector, wherein the second test vector and the first test vector are complementary.

6. A vector controlled motor drive system according to claim 5, wherein the first test vector and the second test vector are defined between the second zero voltage switching vector and the first zero voltage switching vector that is defined at the end portion of each of the three consecutive PWM cycles without any other intervening vectors defined between the second zero voltage switching vector and the first zero voltage switching vector that is defined at the end portion of each of the three consecutive PWM cycles.

7. A vector controlled motor drive system according to claim 6, wherein the first active voltage switching vector and the second active voltage switching vector are defined between the first zero voltage switching vector that is defined at the beginning portion of each of the three consecutive PWM cycles and the second zero voltage switching vector that is defined in the middle portion of each of the three consecutive PWM cycles without any other intervening vectors defined between the first zero voltage switching vector that is defined at the beginning portion of each of the three consecutive PWM cycles and the second zero voltage switching vector that is defined in the middle portion of each of the three consecutive PWM cycles.

8. A vector controlled motor drive system according to claim 3, wherein each PWM cycle includes a first half of the PWM cycle and a second half of the PWM cycle, and wherein the first amplitude value, the second amplitude value and the third amplitude value further collectively define:
a first active voltage switching vector in the first half of each PWM cycle;
a second active voltage switching vector in the first half of each PWM cycle and following the first active voltage switching vector; and
a first test vector defined between the second zero voltage switching vector that is defined in the middle portion of each of the three consecutive PWM cycles and the first zero voltage switching vector that is defined at the end portion of each of the three consecutive PWM cycles without any other intervening vectors defined between the second zero voltage switching vector and the first zero voltage switching vector that is defined at the end portion of each of the three consecutive PWM cycles.

9. A vector controlled motor drive system according to claim 8, wherein the first active voltage switching vector and the second active voltage switching vector are defined between the first zero voltage switching vector that is defined at the beginning portion of each of the three consecutive PWM cycles and the second zero voltage switching vector that is defined in the middle portion of each of the three consecutive PWM cycles without any other intervening vectors defined between the first zero voltage switching vector that is defined at the beginning portion of each of the three consecutive PWM cycles and the second zero voltage switching vector that is defined in the middle portion of each of the three consecutive PWM cycles.

10. A vector controlled motor drive system according to claim 3, wherein each PWM cycle includes a first half of the PWM cycle and a second half of the PWM cycle, and wherein the first amplitude value, the second amplitude value and the third amplitude value further collectively define:
a first active voltage switching vector in the second half of each PWM cycle;
a second active voltage switching vector in the second half of each PWM cycle and followed by the first active voltage switching vector,
wherein the first active voltage switching vector and the second active voltage switching vector are defined between the second zero voltage switching vector and the first zero voltage switching vector that is defined at the end portion of each of the three consecutive PWM cycles;
a first test vector in the first half of each PWM cycle and followed by a second test vector in the first half of each PWM cycle, wherein the second test vector and the first test vector are complementary.

11. A vector controlled motor drive system according to claim 10, wherein the first test vector and the second test vector are defined between the first zero voltage switching vector that is defined at the beginning portion of each of the three consecutive PWM cycles and the second zero voltage switching vector that is defined in the middle portion of each of the three consecutive PWM cycles without any other intervening vectors defined between the first zero voltage switching vector that is defined at the beginning portion of each of the three consecutive PWM cycles and the second zero voltage switching vector that is defined in the middle portion of each of the three consecutive PWM cycles.

12. A vector controlled motor drive system according to claim 1, wherein a number of transitions by the first modified switching vector signal between the low amplitude value and the high amplitude value over the three consecutive PWM cycles is eight.

13. A vector controlled motor drive system according to claim 2, further comprising:
   an AC machine designed to generate a neutral voltage signal; and
   an inverter module coupled to the AC machine and coupled to the test vector and duty cycle generator module, the inverter module being designed to generate three-phase voltage signals based on the first, second and third modified switching vector signals, wherein the three-phase voltage signals drive the AC machine.

14. A vector controlled motor drive system according to claim 13, further comprising:
   a zero-sequence voltage generator module designed to receive the three-phase voltage signals and the neutral voltage signal, and designed to generate sampled three-phase zero-sequence voltages.

15. A vector controlled motor drive system according to claim 14, wherein the zero-sequence voltage generator module, comprises:
   a phase-to-neutral voltage generator module designed to receive the three-phase voltage signals and the neutral voltage signal, and designed to generate machine phase-to-neutral voltage signals;
   a summing junction designed to receive the machine phase-to-neutral voltage signals, and designed to generate a zero-sequence voltage signal based on the machine phase-to-neutral voltage signals; and
   a zero sequence voltage sampling module designed to receive the zero-sequence voltage signal, and designed to generate sequentially sampled three-phase zero-sequence voltages.

16. A vector controlled motor drive system according to claim 14, wherein the AC machine comprises a rotor, and further comprising:
   an output module coupled to the zero-sequence voltage generator module, wherein the output module is designed to receive the sampled three-phase zero-sequence voltages and generate a final estimated angular position of the rotor based on the sampled three-phase zero-sequence voltages.

17. A vector controlled motor drive system according to claim 16, wherein the output module comprises:
   a three phase-to-two phase conversion module designed to receive the sequentially sampled three-phase zero sequence voltage signals and generate two-phase zero-sequence voltages; and
   an angle calculator module designed to receive the two-phase zero-sequence voltages and designed to compute an arctangent angle of a vector represented by the two-phase zero-sequence voltages, wherein the arctangent of the two-phase zero-sequence voltages is the angle of the motor saliency being tracked and is proportional to the final estimated angular position of the rotor.

18. A vector controlled motor drive system according to claim 17, wherein the output module further comprises:
   an angle scaling module that scales the arctangent angle according to a scaling constant to generate the final estimated rotor angular position of the rotor.

* * * * *